Sept. 4, 1956 C. R. MANNING ET AL 2,761,381

RECORD CONTROLLED PRINTING MECHANISM

Filed May 20, 1954

13 Sheets-Sheet 1

| | # | , | S | | @ | % | * | ¤ | 1 | / | J | A | 2 | S | K | B | 3 | T | L | C | 4 | U | M | D | 5 |
|---|---|---|---|---|---|---|---|---|---|---|---|---|---|---|---|---|---|---|---|---|---|---|---|---|---|
| R | | | | X | | | | X | | | | X | | | | X | | | | X | | | | X | |
| X | | | X | | | | X | | | | X | | | | X | | | | X | | | | X | | |
| 0 | | X | | | | X | | | | X | | | | X | | | | X | | | | X | | | |
| 1 | | | | | | | | | X | X | X | X | | | | | | | | | | | | | |
| 2 | | | | | | | | | | | | | X | X | X | X | | | | | | | | | |
| 3 | X | X | X | X | | | | | | | | | | | | | X | X | X | X | | | | | |
| 4 | | | | | X | X | X | X | | | | | | | | | | | | | X | X | X | X | |
| 5 | | | | | | | | | | | | | | | | | | | | | | | | | X |
| 6 | | | | | | | | | | | | | | | | | | | | | | | | | |
| 7 | | | | | | | | | | | | | | | | | | | | | | | | | |
| 8 | X | X | X | X | X | X | X | X | | | | | | | | | | | | | | | | | |
| 9 | | | | | | | | | | | | | | | | | | | | | | | | | |

| | V | N | E | 6 | W | O | F | 7 | X | P | G | 8 | Y | Q | H | 9 | Z | R | I | BL | BL | 0 | - | & | BL |
|---|---|---|---|---|---|---|---|---|---|---|---|---|---|---|---|---|---|---|---|---|---|---|---|---|---|
| R | | | X | | | | X | | | | X | | | | X | | | | X | | | | | X | |
| X | | X | | | | X | | | | X | | | | X | | | | X | | | | | X | | |
| 0 | X | | | | X | | | | X | | | | X | | | | X | | | | | X | | | |
| 1 | | | | | | | | | | | | | | | | | | | | | | | | | |
| 2 | | | | | | | | | | | | | | | | | | | | | | | | | |
| 3 | | | | | | | | | | | | | | | | | | | | | | | | | |
| 4 | | | | | | | | | | | | | | | | | | | | | | | | | |
| 5 | X | X | X | | | | | | | | | | | | | | | | | | | | | | |
| 6 | | | | X | X | X | X | | | | | | | | | | | | | | | | | | |
| 7 | | | | | | | | X | X | X | X | | | | | | | | | | | | | | |
| 8 | | | | | | | | | | | | X | X | X | X | | | | | | | | | | |
| 9 | | | | | | | | | | | | | | | | X | X | X | X | | | | | | |

INVENTORS

BY CLARENCE R. MANNING
NICHOLAS C. STENKO

Burton P. Beatty

ATTORNEY

Sept. 4, 1956 C. R. MANNING ET AL 2,761,381

RECORD CONTROLLED PRINTING MECHANISM

Filed May 20, 1954 13 Sheets-Sheet 2

INVENTORS
CLARENCE R. MANNING
NICHOLAS C. STENKO

BY

Burton P. Beatty

ATTORNEY

Sept. 4, 1956 C. R. MANNING ET AL 2,761,381

RECORD CONTROLLED PRINTING MECHANISM

Filed May 20, 1954 13 Sheets-Sheet 3

INVENTORS
CLARENCE R. MANNING
NICHOLAS C. STENKO
BY Burton P. Beatty
ATTORNEY

Sept. 4, 1956 C. R. MANNING ET AL 2,761,381

RECORD CONTROLLED PRINTING MECHANISM

Filed May 20, 1954 13 Sheets-Sheet 4

INVENTORS
CLARENCE R. MANNING
NICHOLAS C. STENKO

BY

Burton P. Beatty

ATTORNEY

INVENTORS
CLARENCE R. MANNING
NICHOLAS C. STENKO
BY
Burton P. Beatty
ATTORNEY

Sept. 4, 1956 C. R. MANNING ET AL 2,761,381

RECORD CONTROLLED PRINTING MECHANISM

Filed May 20, 1954 13 Sheets-Sheet 6

INVENTORS
CLARENCE R. MANNING
NICHOLAS C. STENKO

BY Burton P. Beatty
ATTORNEY

Sept. 4, 1956 C. R. MANNING ET AL 2,761,381

RECORD CONTROLLED PRINTING MECHANISM

Filed May 20, 1954 13 Sheets-Sheet 7

INVENTORS
CLARENCE R. MANNING
NICHOLAS C. STENKO

BY

Burton P. Beatty
ATTORNEY

Sept. 4, 1956 C. R. MANNING ET AL 2,761,381

RECORD CONTROLLED PRINTING MECHANISM

Filed May 20, 1954 13 Sheets-Sheet 8

INVENTORS
CLARENCE R. MANNING
NICHOLAS C. STENKO
BY
Burton P. Beatty
ATTORNEY

Sept. 4, 1956 C. R. MANNING ET AL 2,761,381

RECORD CONTROLLED PRINTING MECHANISM

Filed May 20, 1954 13 Sheets-Sheet 9

INVENTORS
CLARENCE R. MANNING
NICHOLAS C. STENKO

BY Burton P. Beatty
ATTORNEY

RECORD CONTROLLED PRINTING MECHANISM

Filed May 20, 1954 13 Sheets-Sheet 10

INVENTORS
CLARENCE R. MANNING
NICHOLAS C. STENKO
BY
Burton P. Beatty
ATTORNEY

Sept. 4, 1956 C. R. MANNING ET AL 2,761,381
RECORD CONTROLLED PRINTING MECHANISM
Filed May 20, 1954 13 Sheets-Sheet 11

INVENTORS
CLARENCE R. MANNING
NICHOLAS C. STENKO
BY
Burton P. Beatty
ATTORNEY

INVENTORS
CLARENCE R. MANNING
NICHOLAS C. STENKO
BY
Burton P. Beatty
ATTORNEY

Sept. 4, 1956 C. R. MANNING ET AL 2,761,381

RECORD CONTROLLED PRINTING MECHANISM

Filed May 20, 1954 13 Sheets-Sheet 13

INVENTORS
CLARENCE R. MANNING
NICHOLAS C. STENKO
BY
Burton P. Beatty
ATTORNEY

United States Patent Office 2,761,381

Patented Sept. 4, 1956

2,761,381

RECORD CONTROLLED PRINTING MECHANISM

Clarence R. Manning, Vestal, and Nicholas C. Stenko, Endicott, N. Y., assignors to International Business Machines Corporation, New York, N. Y., a corporation of New York Application May 20, 1954, Serial No. 431,072

4 Claims. (Cl. 101—93)

This invention relates to printing machines and more particularly to the type wherein characters representing designations on record cards are analyzed and the characters represented thereby are printed back on the control record cards.

The principal object of the present invention is to provide an improved means to repeatedly print data from a setting on a printing mechanism until the setting of the printing mechanism is changed under signal control.

A further object of the invention is to provide means in a printing machine to print identical information on a master card and a group of following detail cards from information contained on the master card for that group, the setting on the printing means being retained in the intervals between master cards.

In the present invention information contained on master cards in the form of perforations representing numeric, alphabetic, and special characters can be read and printed on the master cards and on the detail cards succeeding each master card under control of a perforation in a control index position of a selected column in each master card. The machine can also be conditioned to print information in the same manner under control of a perforation in a selected column of each detail card.

Briefly, the present cyclically operable printing machine advances two classes of record cards successively along a card path to a printing means, one of the classes including cards having a control perforation therein. Means is provided to restore a setting on the printing means to a blank condition and sensing means senses the control perforation in a card early in a machine cycle. Means responsive to the sensing of the control perforation by the sensing means controls the restoring means so that the setting on the printing means is restored to a blank condition. Reading brushes then sense perforations representing data on the card having the control perforation to cause a new setting on the printing means later in the same cycle, whereby the new setting is retained and printing is effected from the new setting on each succeeding card until a control perforation is again sensed by the sensing means to restore the new setting to a blank condition.

Other objects of the invention will be pointed out in the following description and claims and illustrated in the accompanying drawings, which disclose, by way of an example, the principle of the invention and the best mode, which has been contemplated, of applying that principle.

In the drawings:

Figs. 1*a* and 1*b* arranged vertically in the order named constitute a vertical section taken along lines 1—1 of Fig. 3, showing the card feeding, selector mechanism, printing and repetitive printing mechanisms of the machine.

Figure 14A:
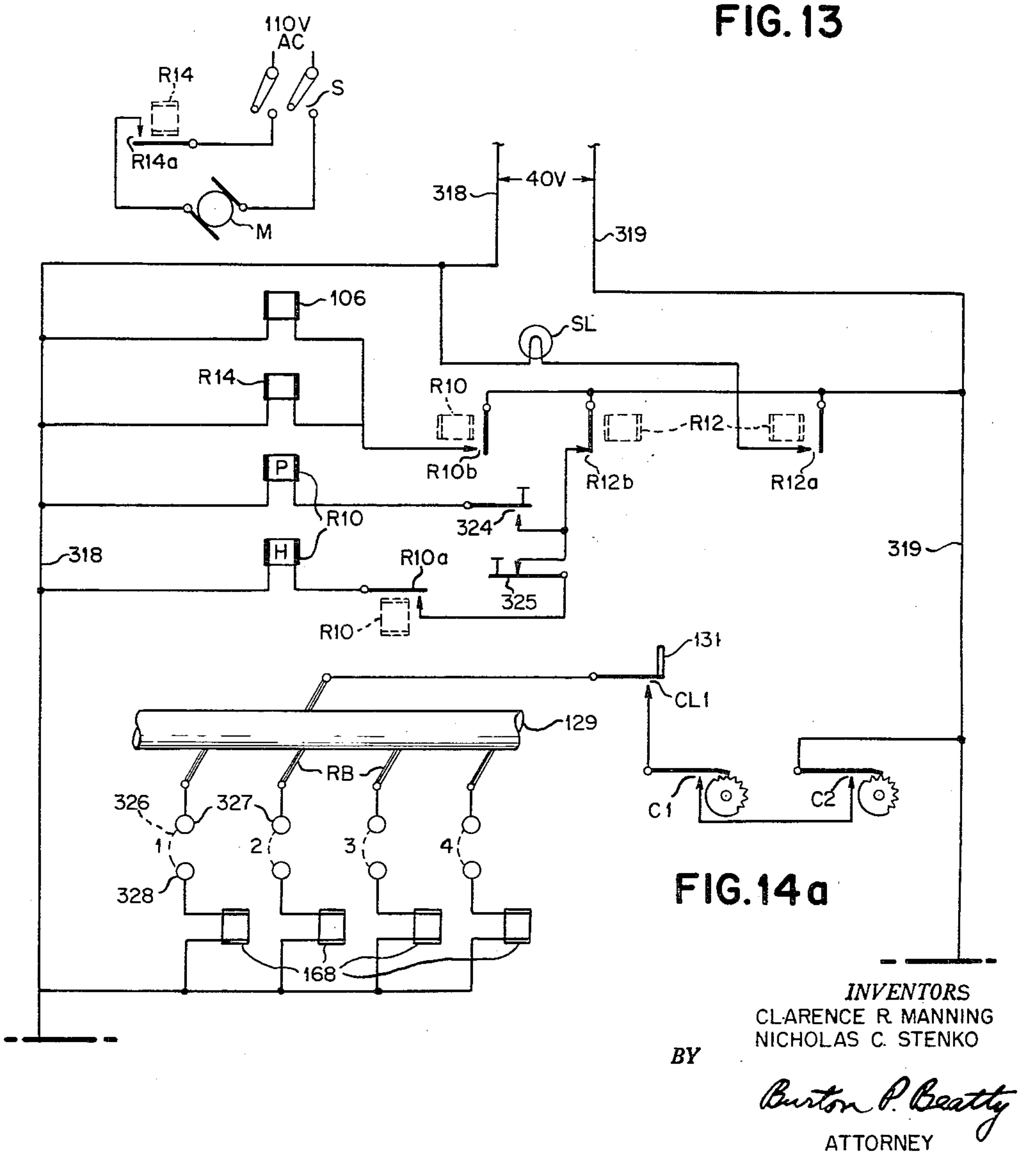
Figure 14B:
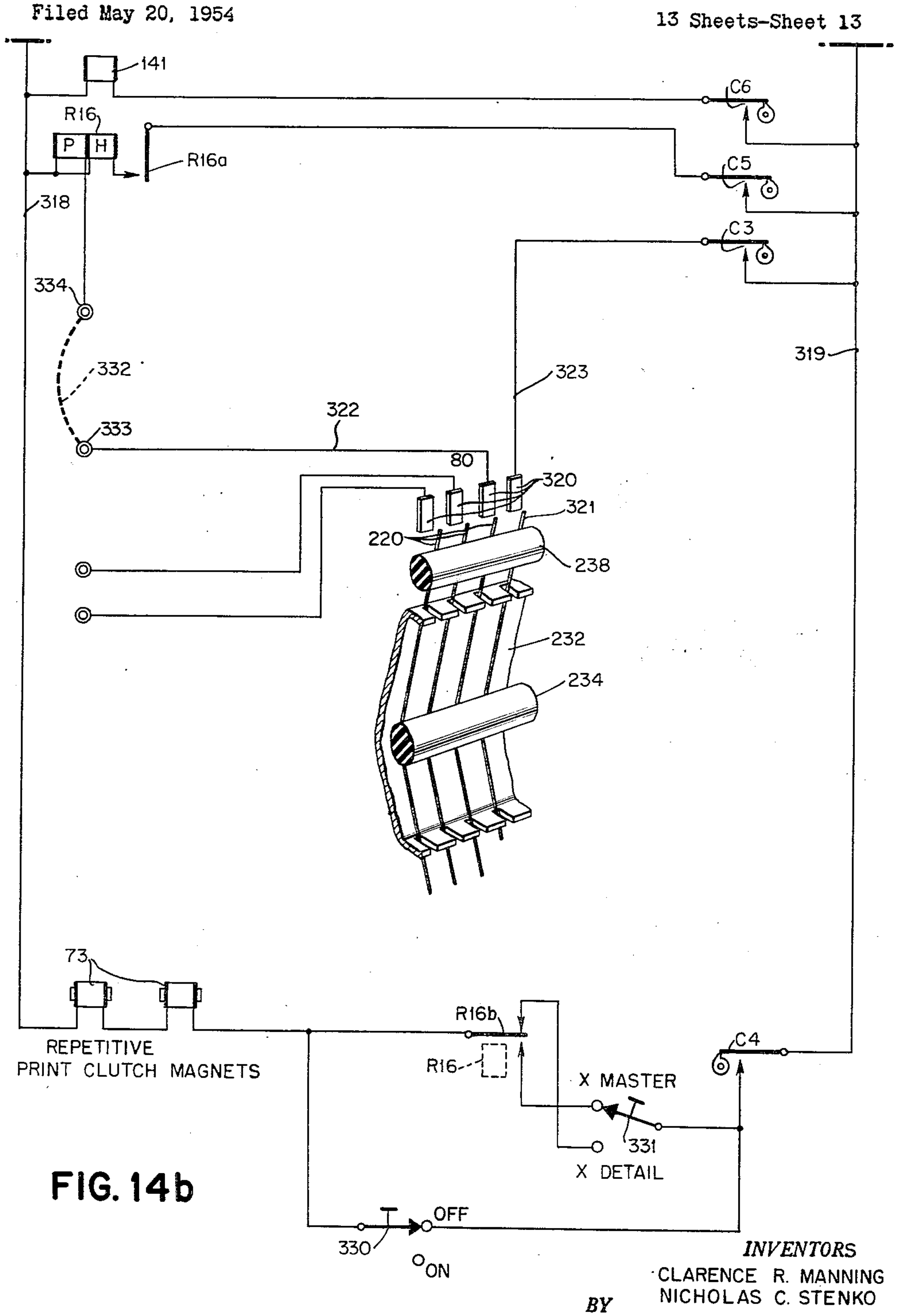

Figs. 14*a* and 14*b* placed one beneath the other comprise an electrical wiring diagram of the preferred form of the invention.

The repetitive printing mechanism of this invention is shown as applied to a printing machine of the type known as an alphabetic interpreter which is disclosed and claimed in the copending application of George F. Daly et al., Serial Number 356,042, filed May 19, 1953. In order to provide repetitive printing a pre-sensing station for reading the control perforation has also been added to the machine of Daly et al. The invention can be adapted for use with various kinds of automatic recording machines and is not limited to use with the above mentioned interpreter.

*Main driving mechanism*

Figure 2:
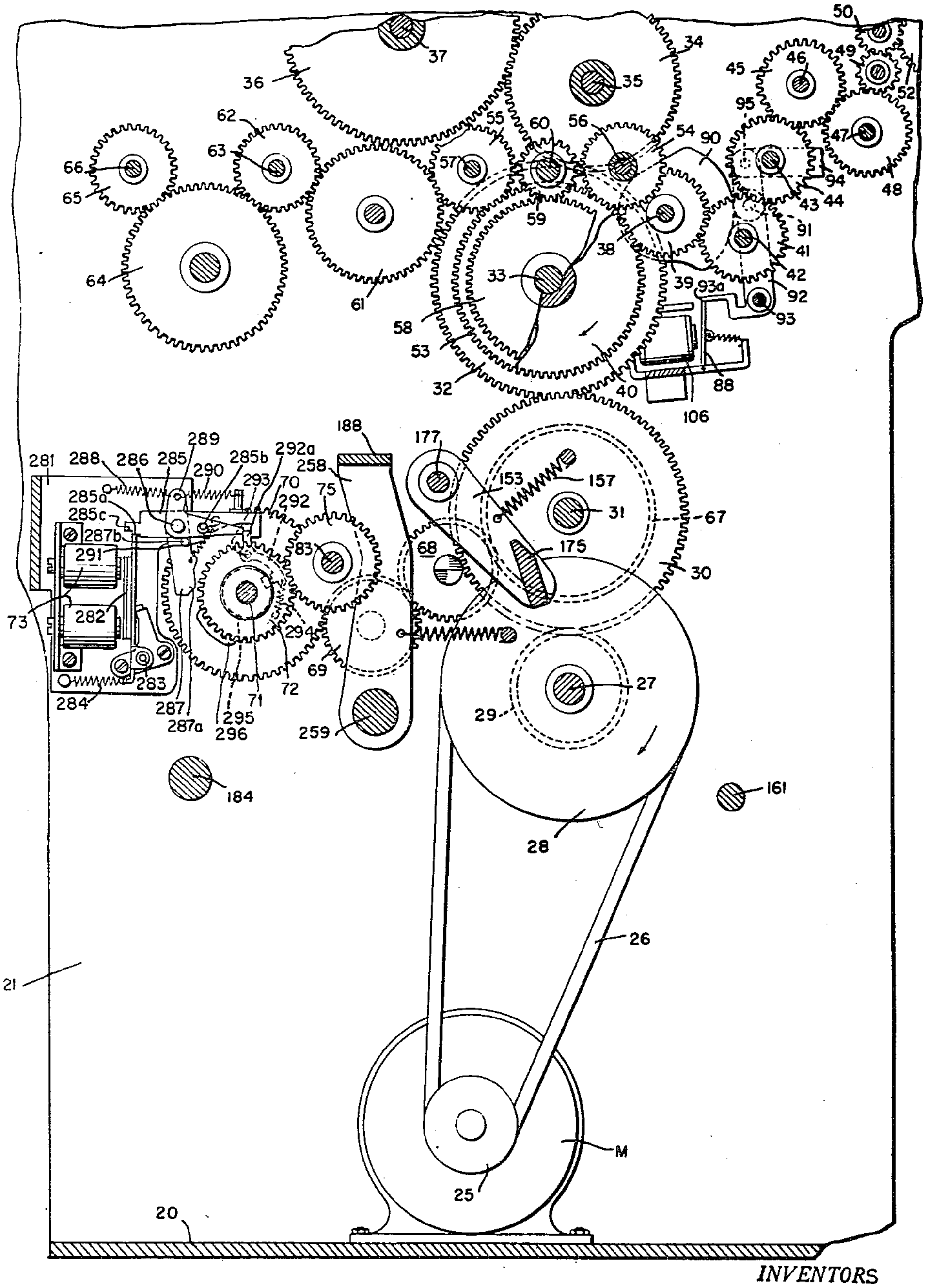
Fig. 2 is a sectional view taken along lines 2—2 of Fig. 3, showing the drive connections of the feeding and selecting mechanisms on one side of the machine and the control devices for the repetitive printing mechanism.

The power or driving mechanism used to operate the selecting, printing, and various card feeding devices consists of an electric motor M, suitably mounted to a cross-frame member 20 of the machine, as shown in Fig. 2. The main framework of the machine comprises two vertical side frame plates 21 and 23 (Fig. 3) and middle frame plate 22. Plates 21 and 22 are interconnected by cross-frame member 20. Tie plates 24 extend between plates 21, 22 and 23. Motor M is provided with a small pulley 25, around which is drawn an endless belt 26. Secured to a main drive shaft 27 is a drive pulley 28, around which the endless belt 26 is passed. Motor M rotates shaft 27 continuously throughout the operation of the machine through endless belt 26, and shaft 27 in turn drives the mechanisms which perform the various machine operations mentioned above.

Again referring to Figs. 2 and 3, shaft 27 has secured thereto a spur gear 29 which is in mesh with a gear 30 fastened to a main camshaft 31 to drive the shaft continuously during machine operation. Camshaft 31 is mounted for rotation in frame plates 21 and 22. Gear 30 in turn meshes with a gear 32 fastened to an auxiliary camshaft 33 which is rotatably mounted in the frame plates 21, 22 and 23 and constantly driven during machine operation. Gear 32 engages an idler gear 34 which is freely mounted on a stud 35 projecting from middle frame plate 22. Idler gear 34 drives a gear 36 secured on a shaft 37 mounted for rotation in frame plates 21 and 22. This shaft 37 is constantly rotated and carries a number of contact operating cams which close contacts designated C1, C2, C3, C4, C5 and C6. The timing and functioning of these devices will be set forth in connection with the explanation of the circuit diagram. Gears 215 and 216 (Fig. 1*a*) are fastened together and are rotatably mounted on a stud 217 extending from frame plate 22. A gear 218 is secured on an auxiliary camshaft 219 which is mounted for rotation between frame plates 22 and 23. Shaft 219 is constantly driven from gear 36 through compound gearing 215, 216 to gear 218. The cams which operate the pre-sensing mechanisms are carried by this shaft and the functioning of these devices will be explained hereinafter.

Figure 3:
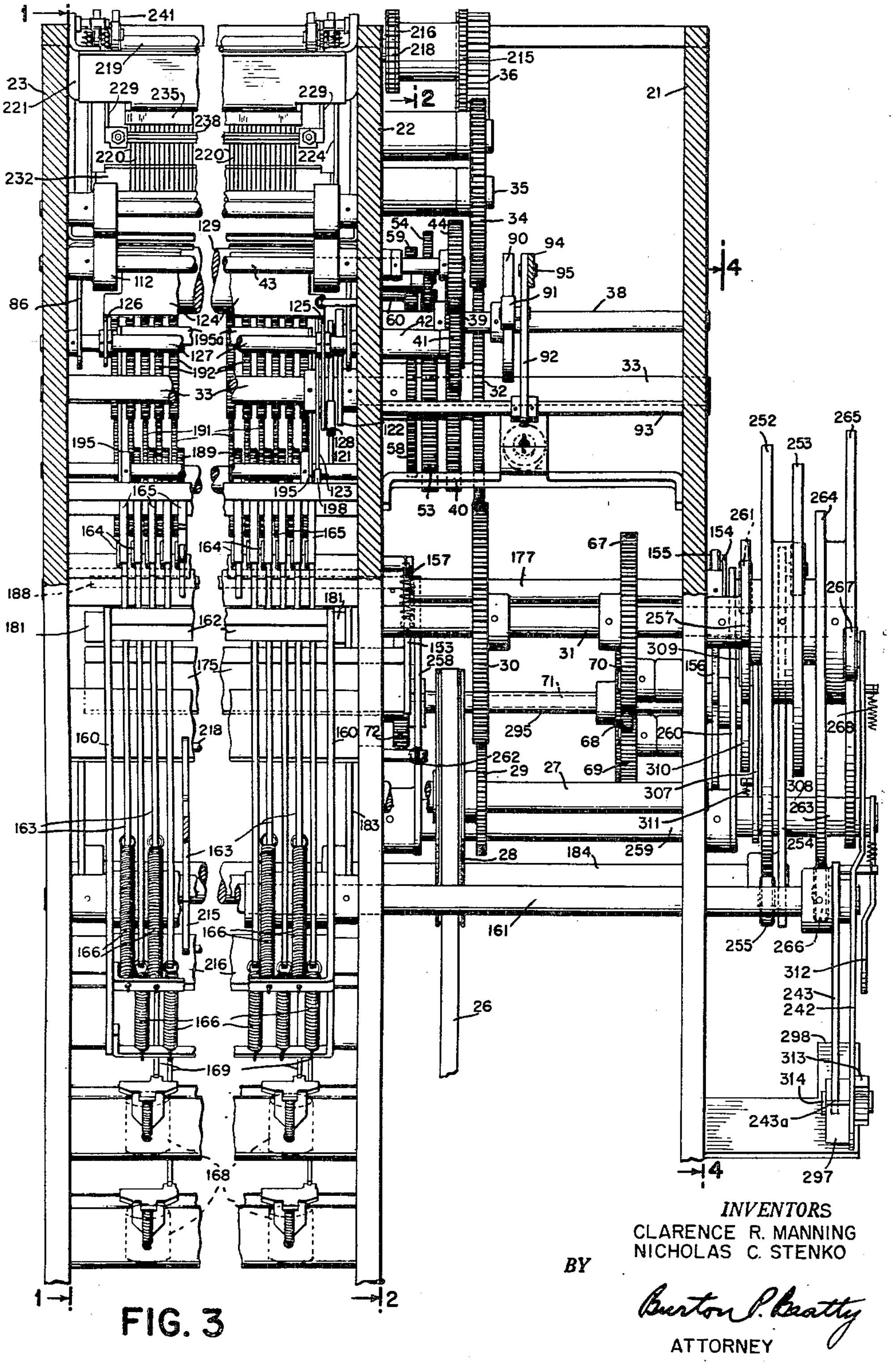
Fig. 3 is a sectional view taken along lines 3—3 of Figs. 1*a* and 1*b*.

A train of gears extends across the middle frame plate 22 to reach the drive connections for the feeding mechanisms which carry the record cards to and from the printing station, as shown in Figs. 2 and 3. It is already explained that auxiliary camshaft 33 is driven by gear 32 through the speed reduction gearing connected to the motor M. A second auxiliary camshaft 38 rides in frame plates 21 and 22 and has secured thereto a gear 39 which which is engaged by a gear 40 fastened on auxiliary camshaft 33. Gear 40 rotates with auxiliary camshaft 33 to drive the second auxiliary camshaft 38 in a counterclockwise direction, as viewed in Fig. 2, through gear 39. An idler gear 41 is freely mounted on a stud 42 extending from frame plate 22. A feed roller shaft 43 rides in frame plates 22 and 23 and carries a gear 44 secured thereto on a portion which projects through plate 22. Gear 39 meshes with idler 41 which in turn transmits counterclockwise motion to gear 44. An idler gear 45 is mounted for rotation on a stud 46 projecting from frame plate 22. A feed roller shaft 47 rides in frame plates 22 and 23 and carries a gear 48 fastened thereto on a portion which extends through plate 22. Gear 44 meshes with idler 45 which in turn transmits counterclockwise motion to gear 48. A pair of small idler gears 49 and 50 are mounted for rotation on studs projecting from frame plate 22. A feed roller shaft 51 (Fig. 1*a*) is rotatably mounted in frame plates 22 and 23 and carries a gear 52 fastened thereto on a portion which projects through plate 22. Gear 48 transmits a counterclockwise motion to gear 52 through idlers 49 and 50.

A gear 53 (Figs. 2 and 3) secured to auxiliary camshaft 33 meshes with gears 54 and 55 fastened to feed roller shafts 56 and 57, respectively, which ride in frame plates 22 and 23. Shafts 56 and 57 are thus driven in a counterclockwise direction, as viewed in Fig. 2. Auxiliary camshaft 33 also carries a gear 58 which meshes with a small gear 59 secured to a contact roller shaft 60 supported for rotation in frame plates 22 and 23, thereby driving shaft 60 counterclockwise. These driving connections operate the mechanisms which carry the record cards to the printing station.

Gear 55 engages a large idler gear 61 (Fig. 2) which is in mesh with a gear 62 secured on a feed roller shaft 63. Gear 62 is in engagement with an idler gear 64 which in turn meshes with a gear 65 fastened to a feed roller shaft 66. Shafts 63 and 66 are supported for rotation in frame plates 22 and 23 and are driven in a counterclockwise direction through this gearing. These driving connections operate the mechanisms which carry the record cards away from the printing station.

A gear 67 is secured to the constantly rotating camshaft 31 and transmits motion to a gear 70 through idler gears 68 and 69, each of which is freely mounted on studs projecting inwardly from frame plate 21. Gear 70 is freely mounted on a shaft 71 which rides in frame plates 21 and 22. A gear 72 is fastened to shaft 71 near frame plate 22 and in turn engages a gear 75 secured to an auxiliary camshaft 83 which carries the camming member for operating the digit slide. Gear 70 is provided with a sleeve which carries a square tooth ratchet 295.

Shaft 71 and camshaft 83 are rotated by gear 70 and ratchet 295 through gear 72 when the control magnets for the repetitive printing mechanism are energized as explained hereinafter.

*Card feeding mechanism*

Figures 1A, 11:
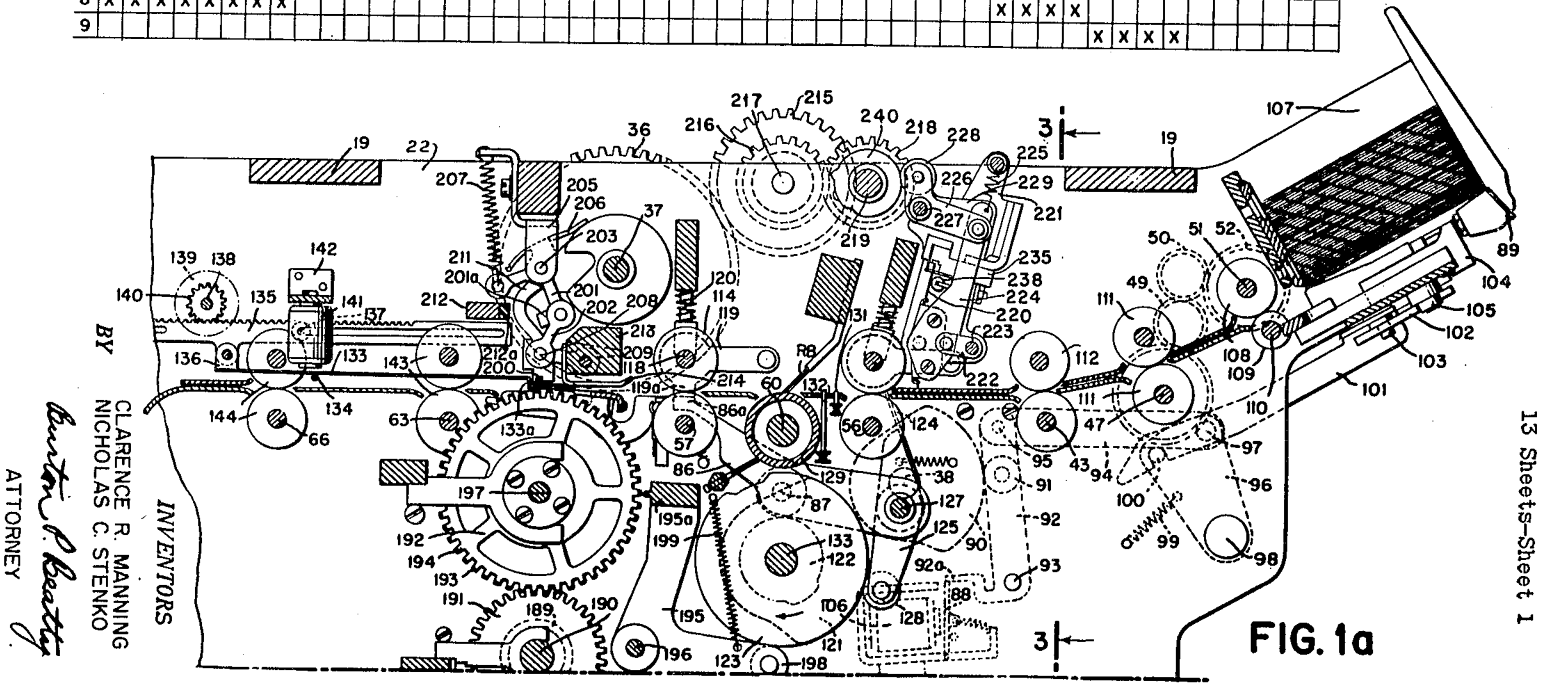
Fig. 11 is a chart showing the coding arrangement used for the data perforated in the record cards.
Figure 10:
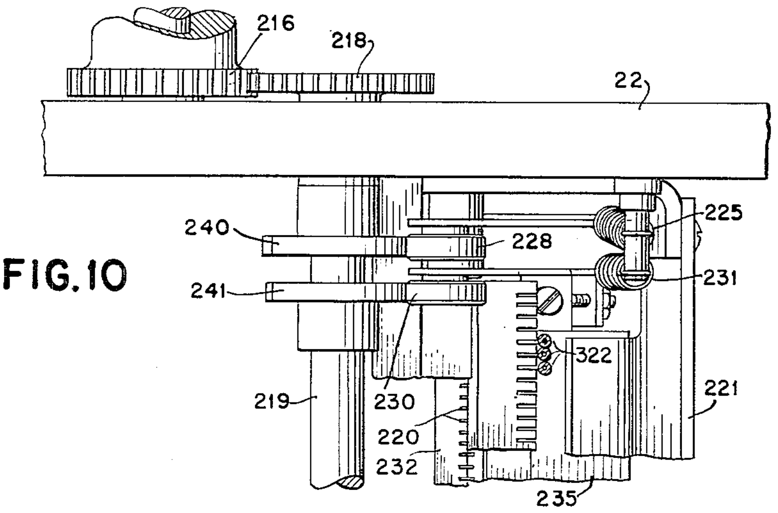
Fig. 10 is a detail plan view showing the cams for operating the pre-sensing mechanism and the drive connections therefor.

Referring to Figs. 1*a* and 3, auxiliary camshaft 38 has a cam 90 secured thereon which engages a follower roller 91 carried by an arm 92 to operate the card picker mechanism. This arm is pivotally mounted on a rod 93 extending between frame plates 21 and 22. A link 94 has a pivotal connection with arm 92 at 95 and with an arm 96 at 97. The arm 96 is freely mounted on a rod 98 and is urged in a counterclockwise direction by a spring 99 to constantly maintain roller 91 against cam 90 through link 94. The arm 96 carries a pin 100 which is adapted to fit within a slot in one end of a push rod 101. The other end of push rod 101 is secured to a bellcrank 102 through a pin connection 103. Bellcrank 102 is connected to a sliding pusher 104 through a pin 105. A knife member 89 is secured to one end of the pusher 104 for engaging the bottom card of the stack in magazine 107. The sliding pusher 104 is reciprocated by bellcrank 102, being moved first toward the left (Fig. 1*a*) and then back again toward the right into normal position. In Fig. 10 it is seen that cam 90 is so formed as to cause knife member 89 to engage the bottom card from 222° of a machine cycle until 300° at which time the card is removed from the magazine. Arm 92 has an extension **92*a* which is engageable by armature latch 88 of magnet 106. The arm 92 is prevented from rotating counterclockwise on rod 93 by latch 88. When magnet 106 is energized, armature 88 is withdrawn from engagement with extension 92*a* to permit arm 92 to pivot freely about rod 93. The lowermost card in magazine 107 is thereby advanced through the usual throat to a first pair of feed rollers 108 and 109 secured on shafts 51 and 110, respectively. Rollers 109 are frictionally driven through upper rollers 108**.

The cards are advanced to the printing station through succeeding pairs of rollers 111, 112, 113 and 114 (Fig. 1*a*) which are driven by shafts 47, 43, 56 and 57, respectively, as previously explained, the upper rollers being frictionally driven from the lower rollers in each pair. The pair designated 113 are skid rollers which are spring pressed against a record card moving between them, so that when a card is halted against the timing shutter, the feed rollers continue to rotate frictionally against the face of the card. The upper rollers of pair 113 are rotatably mounted on a rod 115 which is supported between a pair of arms 116. An arm 116 is pivotally connected to each frame plate 22 and 23 to permit the upper rollers 113 to rest on the top of a card when the card is moved against a stop plate 124. A coil spring 117 urges the upper rollers 113 against the lower rollers with the required amount of pressure to allow for the friction drive. The upper rollers of pair 114 are similarly mounted, being rotatably positioned on a rod 118 which is supported between a pair of arms 119. An arm 119 is pivotally connected to each frame plate 22 and 23, and a coil spring 120 urges the upper rollers 114 against the lower rollers.

A trio of cams 121, 122 and 123 are secured to auxiliary camshaft 33 near frame plate 22 (Figs. 1*a*, 3) and are constantly rotating during machine operation. These cams control various card feeding operations and the type aligner mechanism. The feed rollers 112 advance the cards against stop plate 124 secured on arms 125 and 126. These arms in turn are pivotally mounted on a rod 127 which extends between frame plates 22 and 23.

*Timing shutter operating mechanism.*—The plate 124 is located at the card aligner station and is called a timing shutter in that it intercepts the card and then releases it for further advance at a definite time, so that if in its journey to this point there has been some slippage, it will be brought back into correct time relationship with the machine. On the lower end of arm 125 is a roller 128 which is spring pressed against cam 121 on shaft 33. From Fig. 12 it is seen that roller 128 engages the low portion of cam 121 at approximately 93° in the machine cycle to permit arm 125 to swing clockwise, as viewed in Fig. 2*a*, and raise stop plate 124 into the path of an advancing card. The card is stopped against stop plate 124 at 156° and later released at approximately 270° when the plate is again withdrawn. Feed rollers 113 then advance the card to the sensing station.

*The Pre-sensing mechanism.*—A line of pre-sensing pins 220 (Fig. 1*a*) is located at the card aligner station just preceding the reading station. These pins sense the presence of an X punch in the selected control column of the card as it is being aligned. The sensing of an X punch by pins 220 results in an impulse to the repetitive printing clutch magnets to cause the print setting to be restored through mechanism described hereinafter.

Figure 9:
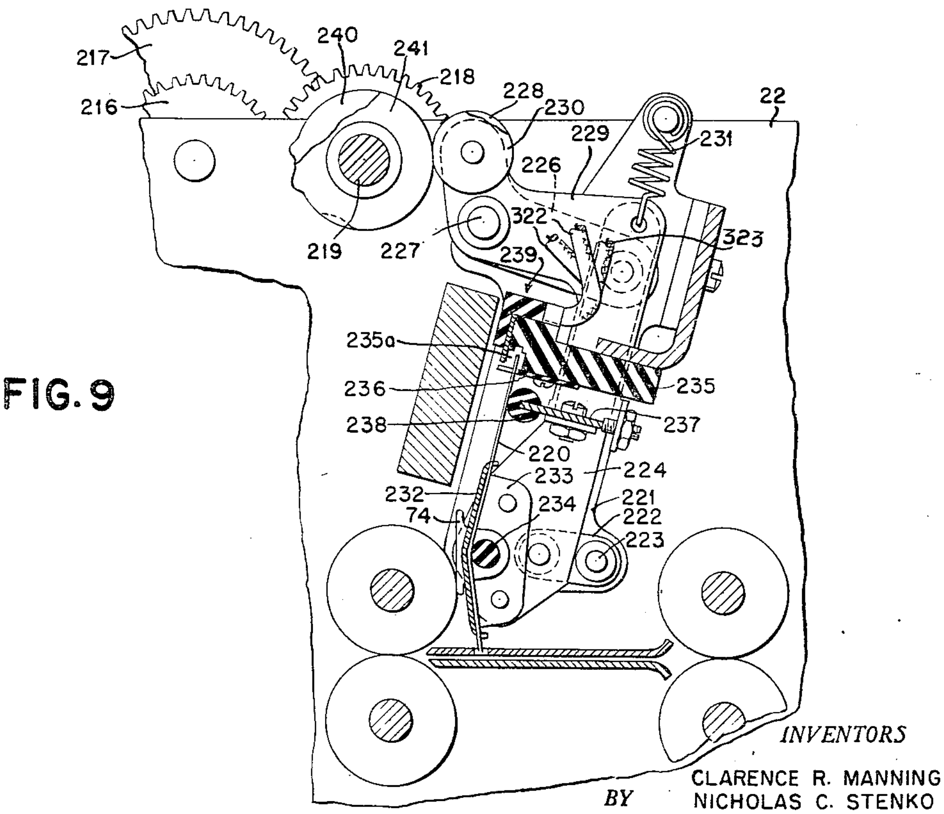
Fig. 9 is an enlarged vertical sectional view showing the pre-sensing mechanism.

A bracket 221 is secured to each frame plate 22 and 23 as shown in Fig. 3. Since the mechanism carried by each bracket 221 is identical, only one such structure will be described in detail. A support arm 222 (Fig. 9) is freely mounted at one end on bracket 221 at 223 and pivotally connected at the other end to an operating arm 224. A spring 225 extends between arm 224 and bracket 221 to bias the arm upwardly to an inactive position. Arm 224 has a cam follower arm 226 pivotally connected to its upper portion. The cam follower is freely mounted on a stud 227 extending from bracket 221 and carries a roller 228 held in engagement with a set-up cam under influence of spring 225. A bellcrank 229 is freely mounted on stud 227 and carries a roller 230 which is held in engagement with a readout cam under influence of a spring 231 extending between the bellcrank and bracket 221. The actions of the setup and readout cams are described hereinafter.

A plate 232 extends between the operating arms 224 and is secured to each arm through a pair of overturned ears 233. This plate is electrically conductive and common to all of the pins 220. The upper and lower portions of plate 232 are bent over and slotted to form comb flanges. The pins 220 are frictionally held within the slots of the comb flanges by an insulating bar 234 which is supported by inserts 74 carried in grooves in plate 232. The pins 220 are free to move within the slots when this frictional force is overcome. An insulating block 235 is supported between brackets 221 and carries a slotted comb plate 236 of insulating material for guiding the upper portion of pins 220 during movement. The pins extend upwardly from plate 232 into a notch **235*a* formed in the undersurface of block 235. Bellcrank 229 carries a bail 237 having an insulating bar 238 secured thereon. This bar is positioned to engage the pins 220 upon actuation of the bellcrank. Any pin which has been moved downwardly into a card perforation is moved by the bar 238 into contact with a separate electrically conductive segment 320** (Fig. 14*b*) on an insulating plate 239 fastened to the block 235. There are eighty pins in the line which coincide with the eighty columns of the card being sensed and an extra pin 321 which engages the side surface of the card on each sensing operation. This extra pin is not restricted by the notch **235*a* but is free to move upon engagement by bar 238 to a contact closing position against a conductive segment 320 on plate 232. The conductive segment for each pin 220 is connected by a wire generally designated 322 to a plug socket of a plug-board as described hereinafter in connection with the wiring diagram. The pin 321 is connected to one side of a source of potential when in contact closing position by a wire 323**.

Referring now to Fig. 10 the auxiliary camshaft 219 carries a pair of cams designated 240 and 241 near the frame plate 23 which cooperatively engage rollers 228 and 230 respectively. From Fig. 12 it is seen that pre-sense set-up cam 240 moves cam follower 226 in a clockwise direction at 162° of a printing cycle, as viewed in Fig. 9, which in turn pushes the operating arm 224 downwardly to lower the pins 220 on to the card after it has been stopped against the timing shutter 124. The pins 220 span the columns of the X index position of the card to sense the occurrence of a perforation. Those pins which engage the card are moved upwardly against the frictional force created by the bar 234 while the pins which sense a perforation extend into the perforation. At 174° roller 228 leaves the high point of cam 240 and pins 220 are raised away from the card by arm 224 under pressure of spring 225. Any pin which has gone through a perforation in the card is not returned to the position within notch **235*a* of block 235, but comes to rest with the upper end positioned below the sides of the notch. At 192° the pre-sense readout cam 241 moves bellcrank 229 in a clockwise direction, as viewed in Fig. 9, to move the bar 238 against the line of pins 220. The pressure of bar 238 causes the upper end of a pin which is not restricted by the sides of notch 235*a* to move against the related segment 320 on plate 239 to complete an electrical circuit to the repetitive printing clutch magnets as described hereinafter in connection with the circuit diagram. Those pins 220 which have their upper ends residing within the notch 235*a* are merely bowed outwardly under pressure of the bar 238 but not sufficiently to come in contact with their related segments 320. At 234° roller 228 enters a depression in cam 240 which permits operating arm 224 to move upwardly under pressure of spring 225. This movement causes the pins 220 which were pushed upwardly when the card was being sensed to be carried against the roof of notch 235*a* and again moved against the force of friction downwardly to a restored position. At 243° the operating arm 224 is moved against the pressure of spring 225 and is restored to the initial position at 252°. The stop plate 124** is withdrawn at 270° to allow the card which has been pre-sensed to advance to the reading station.

*The reading station.*—A line of analyzing brushes RB (Fig. 1*a*) are located at the reading station to read the coded perforations in each record card as it passes beneath the brushes, the perforations in the zone index positions being analyzed in advance of the digit perforations. These brushes RB make wiping contact with a common contact roller 129 mounted on the constantly rotating shaft 60. The brushes RB and contact roller 129 are of conventional structure such as is commonly used in electrically controlled interpreting machines.

*Card lever contacts.*—Between the feed rollers 113 and the contact roller 129 is located the usual card lever 131 which is rocked about its pivot by a passing card to close the usual card lever contacts CL1. Located between contact roller 129 and card lever 131 is a second card lever 132 which may also be rocked about its pivot to close the usual card lever contacts CL2.

Figure 12:
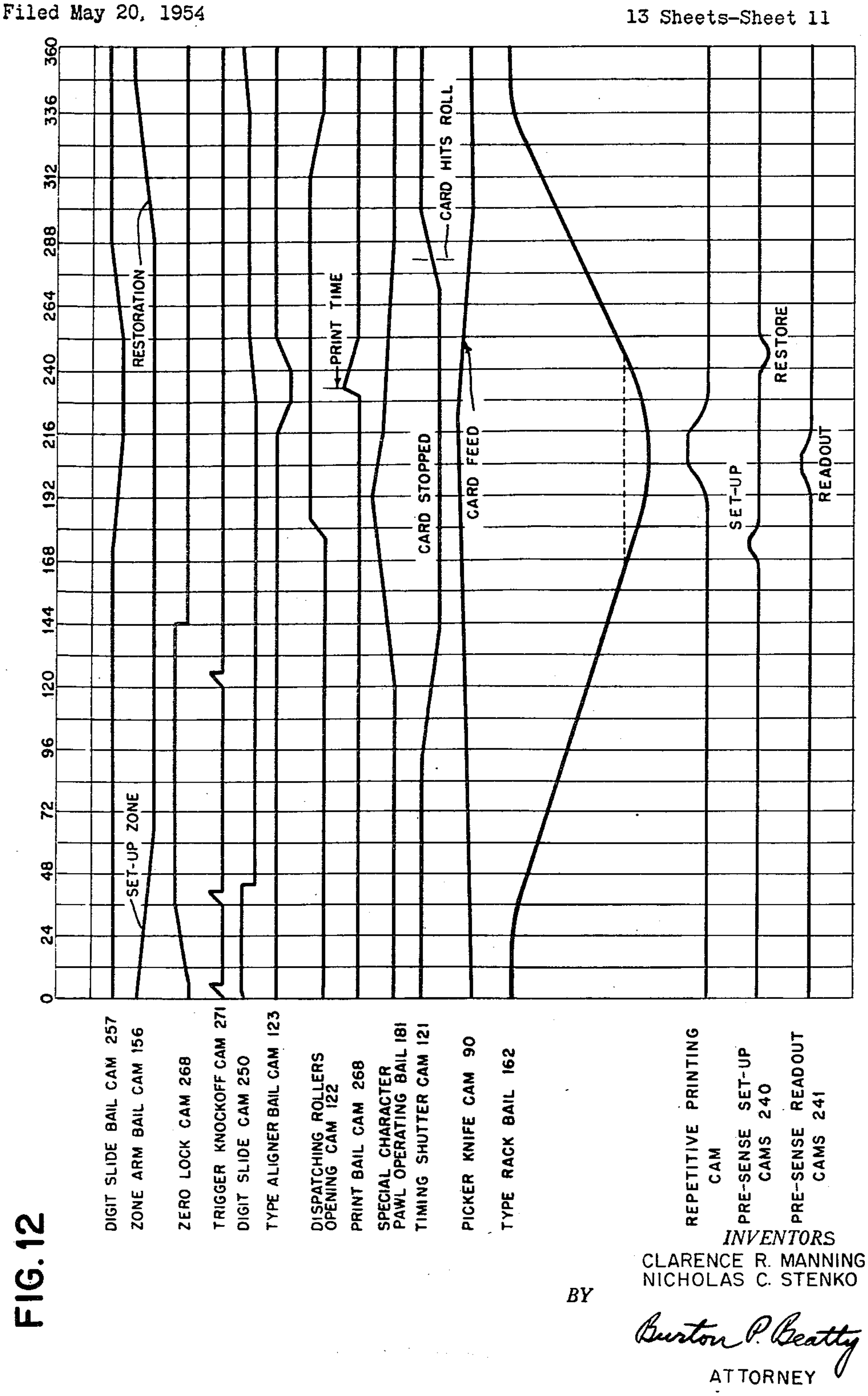
Fig. 12 is a timing diagram which can be followed to understand the various operations of mechanisms shown herein.

*Dispatching rollers.*—The rollers 114 dispatch the cards from the reading station to the printing station at the proper time in each cycle for the printing operation. The arm 119 near frame plate 22 has a cam portion **119*a* which cooperates with a camming surface 86*a* on one end of an arm 86. The other end of arm 86 is freely mounted on rod 127. Arm 86 carries a roller 87 which is maintained in constant engagement with cam 122 by the weight of the arm. When roller 87 reaches the high portion of cam 122, arm 86 is moved upwardly to raise arm 119 through the action of surface 86*a* against cam portion 119*a* of arm 119. This raising of arm 119 causes the upper rollers 114 to separate from the lower rollers 114, thereby preventing any positive feeding action by these rollers. Referring to Fig. 12, it is seen that the upper rollers 114 are separated from lower rollers 114 from 183° to 312° of a machine cycle whereupon the rollers again close to the card feeding position. It is noted that rollers 114** are open at the printing time to prevent excessive pressure of a card against the card stop located at the printing station which is described hereinafter.

*Card positioning stop mechanism.*—At the printing station (Figs. 1*a*, 8) is located a mechanism which functions to stop the card in any one of twenty-five positions to present any one of the twenty-five lines of the card to receive printing from a row of type wheels. This mechanism comprises a stop or shutter 133 resting on a support rod 134 which extends between frame plates 22 and 23. This stop is pivotally mounted on one end to a pair of movable racks 135 through a pair of ears 136 extending upwardly from stop 133. The other end of stop 133 has a turned down portion **133*a* which projects into the path of the advancing record cards. The racks 135 are slidably supported to each frame plate 22 and 23 by studs 137 which extend into slots in each rack 135. A shaft 138 extends from frame plate 22 and through frame plate 23 where a knob 139 is secured to the shaft. A pair of pinions 140 are fastened to shaft 138 above the movable racks 135 to mesh with gear teeth on the upper surface of the racks. It is thus seen that the stop 133 can be positioned by hand to a predetermined setting through knob 139**.

A solenoid 141 is rigidly mounted to a bracket 142 fastened to frame plates 22 and 23. This solenoid is so positioned that its core is adjacent to the upper surface of stop 133. Energization of solenoid 141 causes its core to pull the stop 133 upwardly at any of the twenty-five printing positions. After each printing operation, the solenoid 141 is energized, as explained hereinafter in connection with the circuit diagram, to raise stop 133 out of the path of the printed card.

After the printing operation, the cards are advanced to the usual card stacker mechanism (not shown) through succeeding pairs of rollers 143 and 144 (Fig. 1*a*) which are driven by shafts 63 and 66, respectively, as previously explained, the upper rollers being frictionally driven from the lower rollers in each pair.

*Alphabetic printing mechanism*

During the explanation of the card feeding mechanism, it was pointed out that a card can be stopped in a plurality of printing positions opposite type wheels 192 (Fig. 1*a*). The manner in which these wheels are adjusted will now be set forth.

Figure 1B:
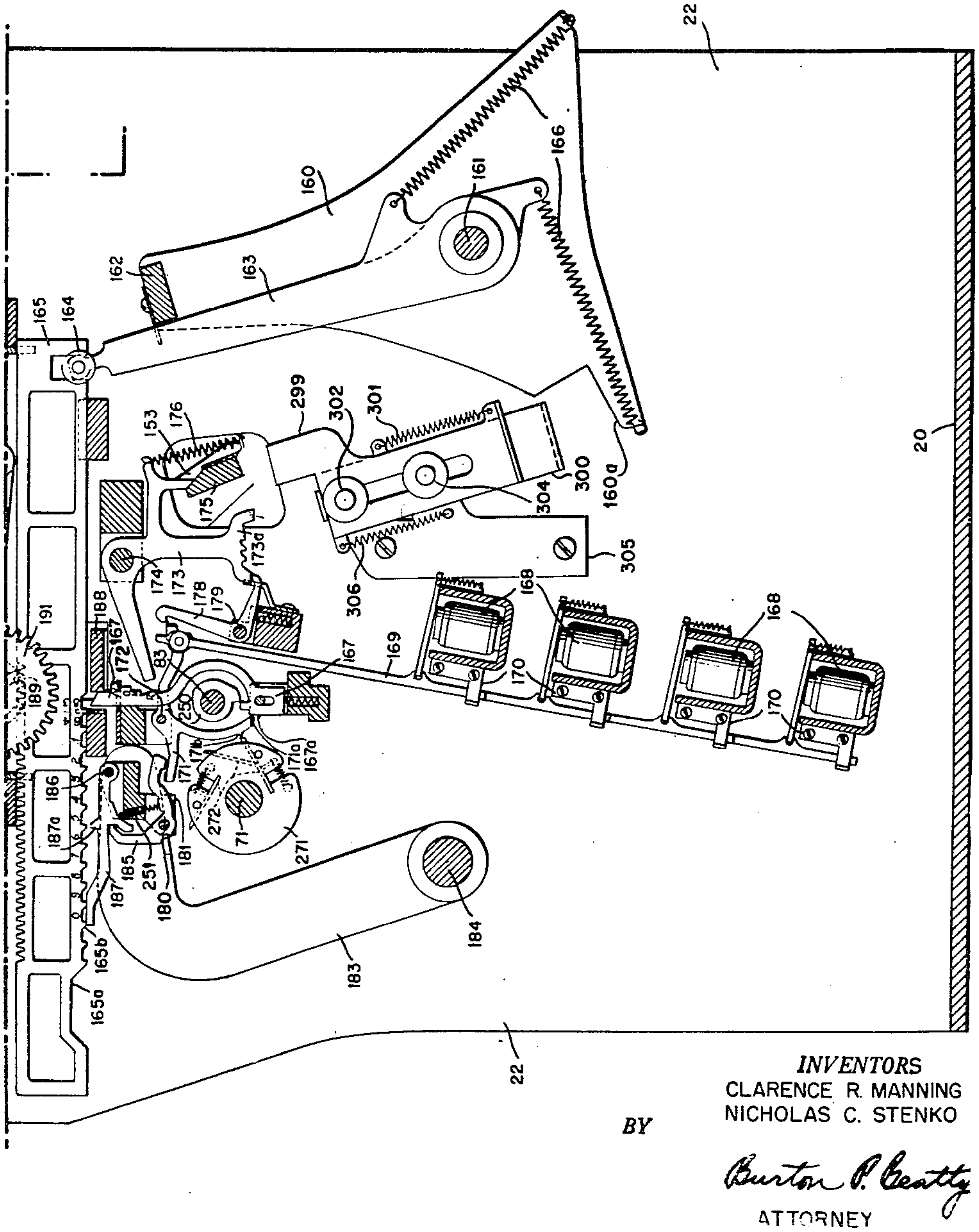

*Print selector mechanism.*—Referring now to Figs. 1*b* and 3, a type rack follower arm 160 is fastened on a shaft 161 and carries a crosshead or bail 162. Shaft 161 is mounted for rotation in frame plates 21, 22 and 23 and has an active cam follower arm 242 fastened thereto and a complementary cam follower arm 243 freely mounted thereon outside of frame plate 21. A pair of complementary cams 264 and 265 are secured to the main cam shaft 31 and are engaged by a pair of rollers 266 and 267 carried by the complementary and active cam follower arms respectively. A spring 268 extends between these arms to yieldably hold the rollers 266 and 267 against the cams 264 and 265. When the cam follower arms 242 and 243 are latched together in a manner described hereinafter, the cams 264 and 265 positively rock the shaft 161 during each machine cycle of operation to restore the setting at the printing station. In Fig. 1*b* follower arm 160 is shown in neutral position before commencing a print selecting operation. Pivotally mounted on shaft 161 is a rack arm 163 which is provided with a roller 164 at its upper end. This roller rides freely in a slotted portion of a rack 165 to form a slidable connection between rack arm 163 and rack 165. This rack 165 is free to reciprocate in suitable support members. Rack arm 163 is urged against crosshead 162 by spring 166 which is secured to the follower arm 160. From Fig. 12 it is seen that at approximately 42° index timing the crosshead 162 moves upwardly under the influence of cams 264 and 265 and rack arm 163 follows it which in turn moves the rack 165 to the right with uniform motion. At 210° the crosshead 162 starts to restore and continues until 336°. The upward movement of the crosshead permits the rack 165 to move to the right under pressure of spring 166 until it is stopped by a spring pressed digit slide 167, as explained hereinafter. This slide is mounted on a vertically slidable pivot pin 224. For purposes of this invention four type wheels and associated selector mechanisms are shown in Fig. 3, but it should be understood that any suitable number may be provided without departing from the spirit of this invention.

The print selecting mechanism operates on the principle of positioning the rack 165 (Fig. 1*b*) in one of forty-seven positions and, by means of an intermediate gear, rotating a type wheel to present the character corresponding to the selected rack position at the printing line. The various rack positions are obtained from combinational hole perforations of the code shown in Fig. 11 in which the numeric characters are designated by a digit perforation, the alphabetic characters by a zone and a digit perforation, and the "8" special characters by a zone perforation and two digit perforations. There are three additional special characters which are designated by a zone perforation alone. The numeric positions are represented by the large rack teeth **165*b* numbered 1 through 9 on the bottom portion of the rack 165. The zone positions are represented by four steps, R, X, O and N cut in the digit slide 167 which stops rack 165 on its travel to the right to set up a type wheel. Special characters are set up using the rack teeth designated 8—3 and 8—4. In setting up numeric and alphabetic characters the rack 165 is positioned by the digit slide 167 first engaging one of the numeric teeth to stop the rack and then moving to the right until a zone step is engaged to complete the set-up. Therefore, each numeric tooth 165*b* may be associated with any one of four zone steps and stop the rack in four different positions for each rack tooth. Eight of the special characters are set up in a similar manner by utilizing the 8—3 and 8—4 teeth. Three of the special characters have a single code designation in a zone index position, and a hot zero impulse is used to permit the digit slide 167 to intercept rack 165** at the proper time to engage a numeric tooth. These three special characters are zero (0), minus (—), and ampersand (&).

Figure 13:
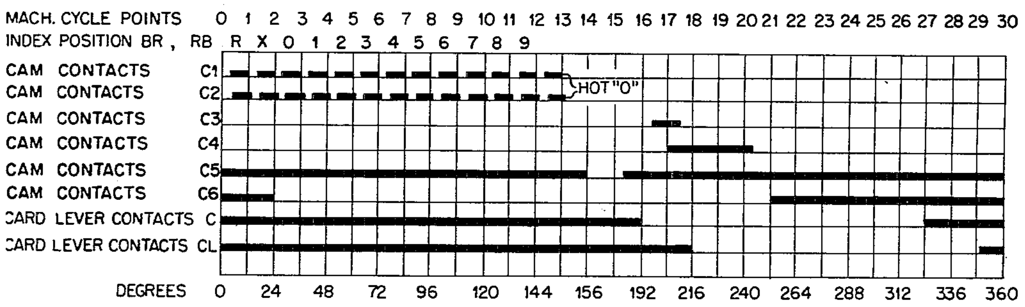
Fig. 13 is a timing chart showing the timing desirable to close certain electrical contacts and circuits.

For the purpose of this description, we will assume that an asterick (*) is to be set up on the type wheel and printed. Referring to the code chart of Fig. 11, it is seen that a card must be punched in the X, 4 and 8 positions to effect the printing of an asterisk. Since the cards are fed through the reading brushes RB with the R or 12 index position first, the X index position is the first perforation sensed. This position will be read between 17° and 24° index timing, as shown in Fig. 13. A print magnet 168 (Fig. 1*b*) is energized through the sensing of this perforation in the X position, as described hereinafter in connection with the description of the circuit diagram. It should be noted that a magnet 168 is provided in each order to operate mechanisms identical with those about to be described. The armature of magnet 168 engages a link 169 which is suitably mounted for reciprocation and held in the position shown by a support member 170. The upper end of link 169 is pivotally connected to a trigger 171 which is freely mounted on a stud 172. The lower arm of trigger 171 has a turned out flange **171*a* which is adapted for positioning in the path of a projection 167*a* on digit slide 167. As long as the trigger 171** is in the inoperative position shown in Fig. 1*b*, the digit slide is prevented from moving upwardly. When magnet 168 is energized, the armature is moved against the core, and link 169 rotates trigger 171 about stud 172 in a clockwise direction, as viewed in Fig. 1*b*, to remove flange **171*a* from the path of projection 167*a***.

Figure 4:
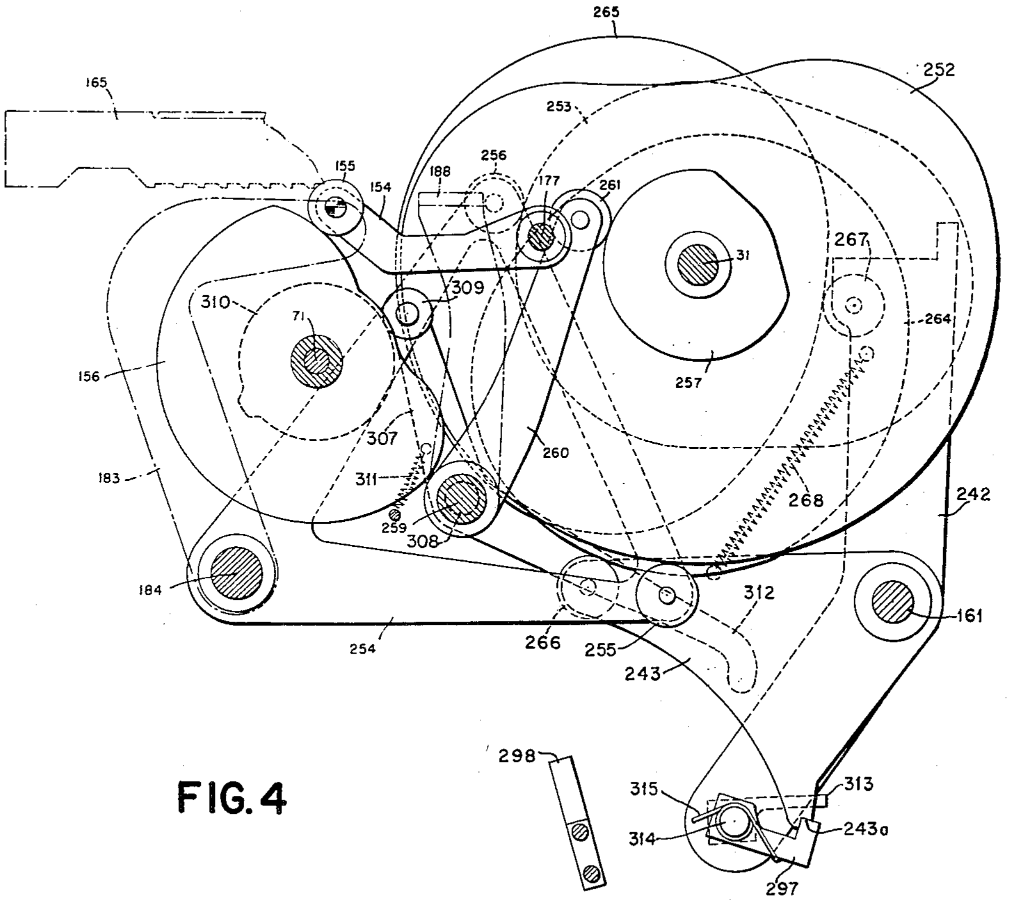
Fig. 4 is a sectional view taken along lines 4—4 of Fig. 3, showing the cams which control the functions of the selector and the repetitive printing mechanisms.
Figure 5:
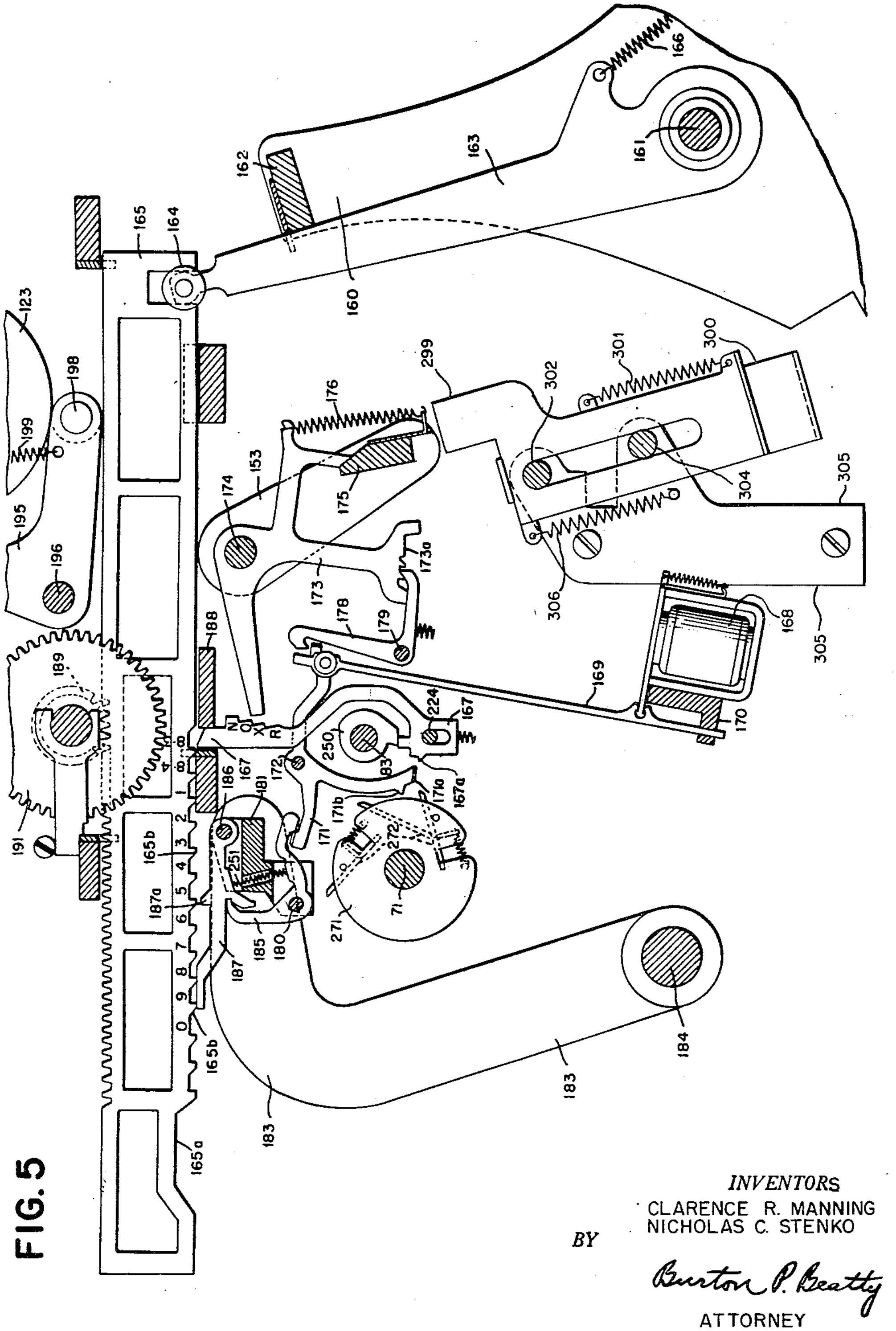
Fig. 5 is a vertical section through the selector mechanism showing the relative positions of the parts in the first step of setting up an "X" zone for printing an asterisk and the zone restoring bail disengaged from the locking slide.

A zone arm 172 is freely mounted on a stud 174 and is engaged by a bail 175 projecting through an opening in frame plate 22. A coil spring 176 extends between the zone arm 173 and bail 175 to constantly urge these members toward engagement. Bail 175 is carried by an arm 153 (Figs. 2, 3) secured to a shaft 177 which rides in frame plates 21 and 22. A cam follower arm 154 (Fig. 4) is fastened to shaft 177 near frame plate 21 and carries a roller 155 which engages a cam 156 secured to shaft 71. A spring 157 extends between arm 153 and frame plate 22 to maintain roller 155 against cam 156. From Fig. 12 it is seen that zone arm cam 156 moves bail 175 counterclockwise at 0°, as viewed in Fig. 1*b*, which in turn allows zone arm 173 to rotate clockwise to a position where its second or X notch is opposite the lower end of a spring pressed latch 178 pivotally mounted on a stud 179 (Fig. 5). Bail 175 moves clockwise until 66° index timing and remains in this position until 282° whereupon restoration is effected.

When the zone arm 173 started its clockwise movement, the lower end of latch 178 left the high tooth on zone arm 173 causing a slight counterclockwise rotation of latch 178 and allowing the upper end of latch 178 to stop against the upper right arm of trigger 171. Thus, it is seen that the clockwise movement of trigger 171 at the time that the X perforation is sensed permits the upper end of latch 178 to pass over the upper right arm of trigger 171 while the lower end of the latch engages the X tooth in the zone arm 173, thereby positioning the upper end of the zone arm under the X step in the digit slide 167, as shown in Fig. 5. From Fig. 12 it is seen that the release of digit slide 167 during the reading of the R, X, and O index point positions is prevented by the high dwell surface on a cam member 250 secured to shaft 83.

The trigger 171 is restored by a cam member 271 which is secured to shaft 71. This cam member carries three fingers designated 272 which project outwardly therefrom. When trigger 171 is in the clockwise position described above a raised portion **171*b* on the lower arm of the trigger lies in the path of the fingers 272. From Fig. 12 it is seen that these fingers 272 are arranged on cam member 271 to engage the portion 171*b* of trigger 171 at the 12 time, 1 time and 8 time respectively to restore the trigger at these times. In this manner a single print magnet 168** and associated trigger mechanism may be used to set up numeric and alphabetic data and special characters.

Figure 6:
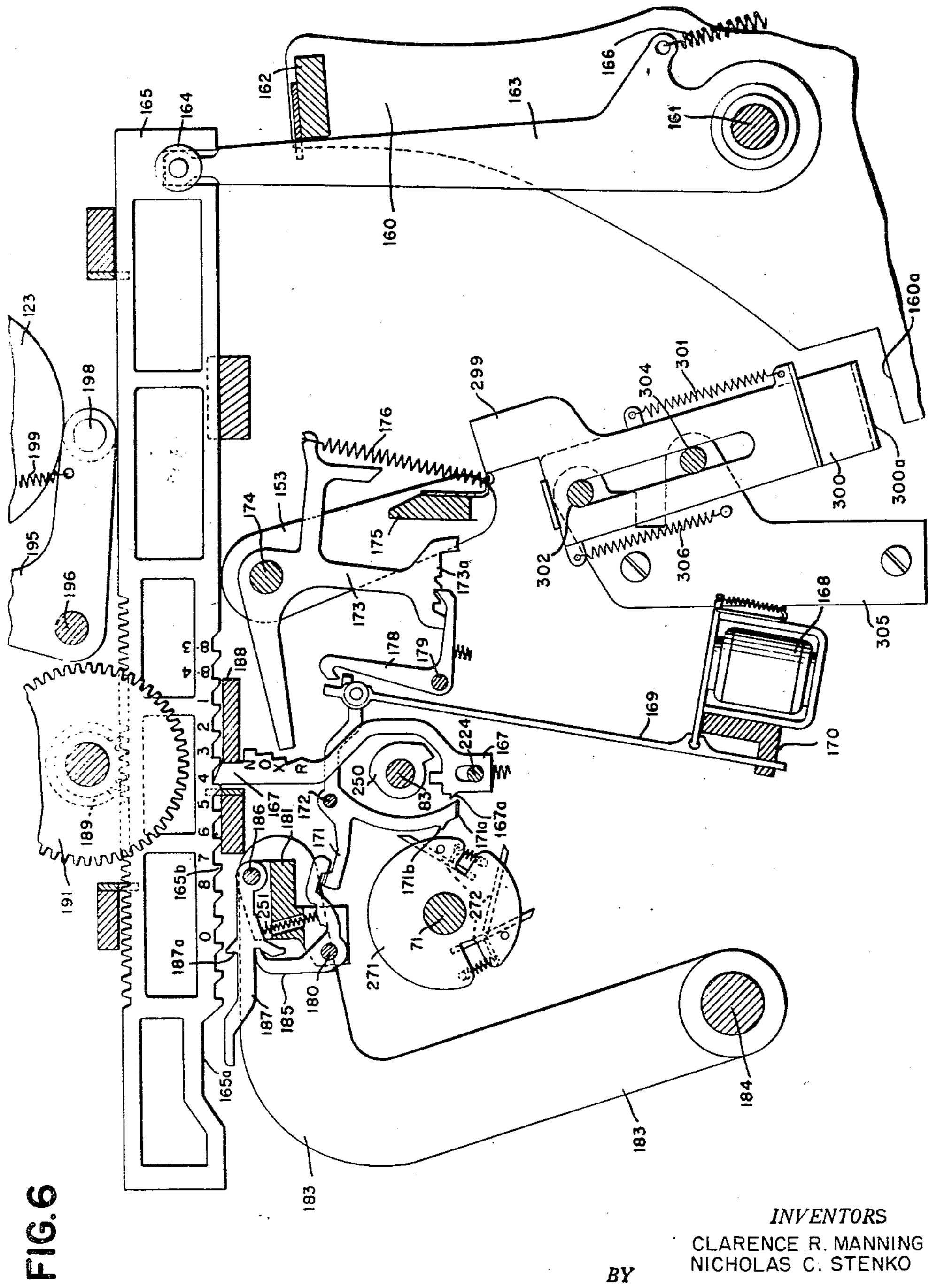
Fig. 6 is a vertical section similar to Fig. 5, showing the relative positions of the parts in the second step of setting up a "4" for printing an asterisk and the zone restoring bail still unlocked.

The next perforation to pass the sensing brushes is in the 4 index point position. This position is read between 77° and 84° index timing (Fig. 12) and causes magnet 168 in the related order again to be energized through a circuit described later. Link 169 again rotates the trigger 171 in a clockwise direction to allow digit slide 167 to engage the 4 tooth on rack 165 and stop the rack in its travel. The relative position of the various members is shown in Fig. 6. A second zone impulse is not effected at this time since the zone arms 173 which had not received a zone impulse had moved to the neutral position to allow clearance between the upper end of latch 178 and trigger 171.

The last perforation to pass the sensing brushes in the code group for printing an asterisk is in the 8 index point position. This position is read between 125° and 132° index timing (Fig. 12). A special character bail 181 is secured to a pair of arms 183 (Fig. 3) which are fastened to a shaft 184 riding in frame plates 21 and 22. The bail 181 is of comb structure having rods 180 and 186 extending therethrough. A latching member 185 is pivotally mounted on rod 180 and cooperates with a pawl 187 which is pivotally mounted on rod 186 and is provided with a tooth **187*a* projecting from its upper surface toward rack 165. A compression spring 251 extends between the latch 185 and the pawl 187 to constantly urge the latch toward latching engagement with the pawl. A pair of complementary cams 252 and 253 are secured to the main camshaft 31 (Fig. 3). A triangularly shaped cam follower 254 (Fig. 4) is fastened to shaft 184 and carries a pair of rollers 255 and 256 which engage cams 252 and 253, respectively. These cams act to positively rock the shaft 184 during each machine cycle. Referring to Fig. 12, it is seen that at approximately 117° the bail 181** is moved counterclockwise (Fig. 1*b*) by the complementary cams 252 and 253 and is continued until 192°.

Figure 7:
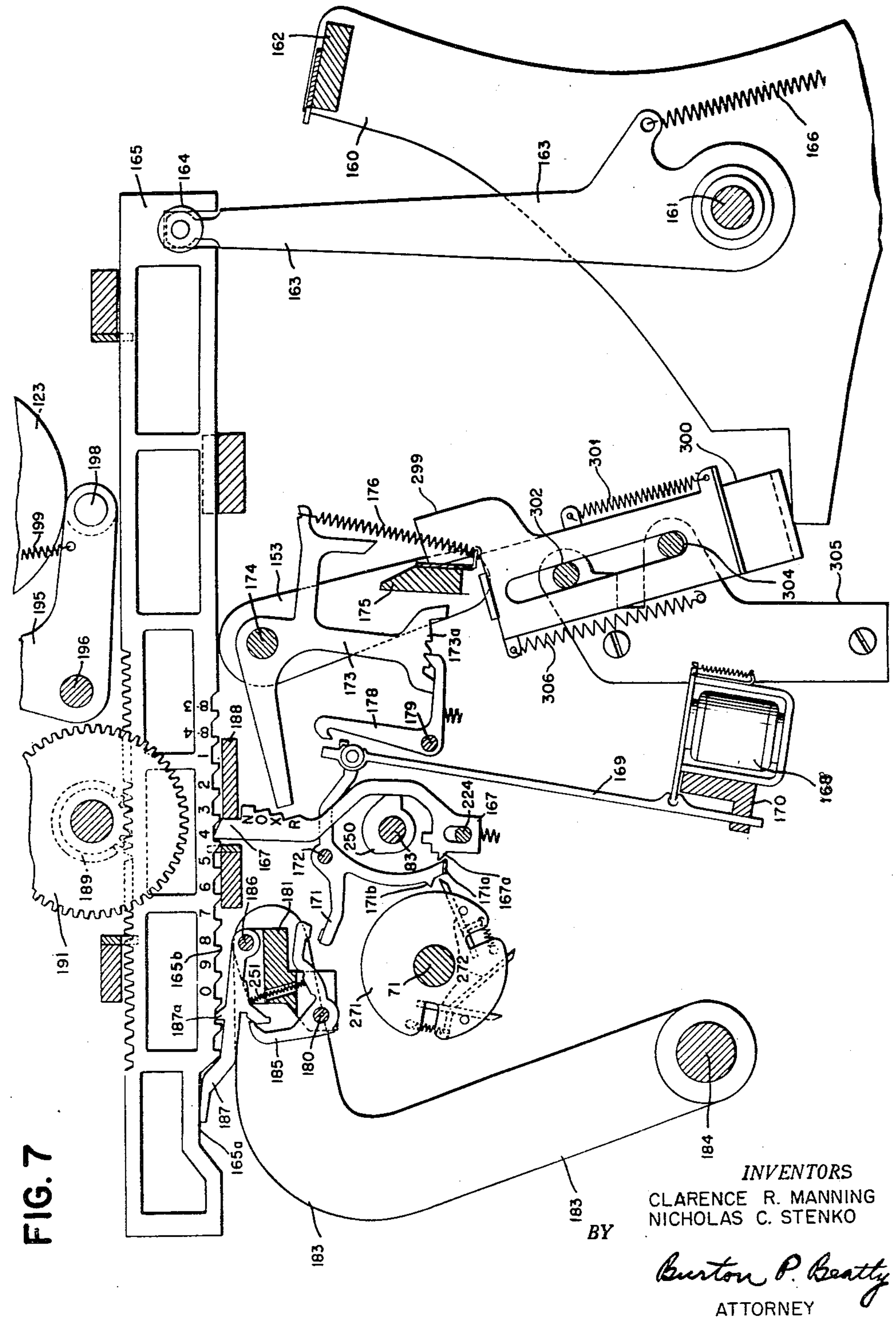
Fig. 7 is a vertical section similar to Fig. 6, showing the relative positions of the parts in the third step of setting up an "8" for printing an asterisk and the zone restoring bail locked in position by the locking slide.

At the time that the 8 index position is read, the lower right end of latch 185 is positioned opposite the upper left arm of trigger 171. The magnet 168 is again energized, and trigger 171 is rotated clockwise to move latch 185 counterclockwise about rod 180, thereby releasing the pawl 187 for engagement of tooth **187*a* with the tooth which is in the furthest left position of rack 165, as shown in Fig. 7. During this time the bail 181 continues to move counterclockwise carrying rack 165 to the left until the tooth designated 8—4 drops over the digit slide 167. The rack 165 is thereby retracted to the position where the digit slide 167** engages the 8—4 tooth.

At 173° of the cycle (Fig. 12) a bail 188, which is positioned near the upper portion of digit slide 167, begins to move to the right (Fig. 1*b*), and the bail 181 begins to restore. A cam 257 is secured to the main camshaft 31 outside of frame plate 21 (Fig. 3). The bail 188 is carried by an arm 258 secured to a shaft 259 which rides in frame plates 21 and 22. A cam follower arm 260 (Fig. 4) is fastened to shaft 259 near frame plate 21 and carries a roller 261 which engages cam 257. A spring 262 extends between arm 258 and frame plate 22 to maintain roller 261 against cam 257. The digit slide 167 engages the bail 188 under pressure of rack arm spring 166 and follows the bail in its movement until the X step rests against the zone arm 173 which was positioned as previously explained. The set-up of an asterisk (*) at the printing line is thus completed. At 252° bail 188 starts to restore and continues until 288° where restoration is completed.

It should be noted that rack 165 has a notch **165*a* which permits the tooth 187*a* of special character pawl 187 to engage either of the two teeth in the furthest left position of the rack only when the rack has previously been stopped by the digit slide 167 in the 3 or 4 tooth. Thus, an impulse to magnet 168 from sensing a perforation in the 8 index point position alone or the sensing of a perforation in the 8 position with a zone will normally stop rack 165 with the 8 tooth on the digit slide 167, and although latch 185 has been released by trigger 171, the special character pawl 187 is prevented from engaging a tooth on rack 165 because the upper end of pawl 187** is riding on the high surface of the rack.

The foregoing is concerned with the setting up of the type wheel for printing the special character asterisk (*) which involves the sensing of three perforations in a single column by the reading brushes RB and is one of the most complicated of the character selections to be made. It should be realized that for the selection of numeric or alphabetic characters there will be less mechanism involved since the special character mechanism does not participate in the selection. For example, in setting up the numeric character three (3), only one perforation in the 3 index point position of a column is sensed by brushes RB to cause magnet 168 to be energized (Fig. 1*b*). The trigger 171 is rotated clockwise to allow digit slide 167 to engage the 3 tooth on rack 165 and stop the rack in its travel. Since no zone impulse was previously sent to magnet 168, the zone arm 173 returns to its normal position where the upper end is opposite the N step of digit slide 167 to prevent the slide from following bail 188 in its movement to the right. The set-up of the numeric character three (3) at the printing line is thus completed.

In setting up an alphabetic character such as the letter C, perforations are sensed in the R and 3 index point positions of a column by brushes RB. Magnet 168 is energized by the sensing of the R index point position to cause the upper end of zone arm 173 to be positioned opposite the R step of digit slide 167. Magnet 168 is again energized at the 3 time to allow digit slide 167 to engage the 3 tooth on rack 165 as before. The digit slide then follows bail 188 in its movement until the slide encounters the zone arm 173. The set-up of the alphabetic character C at the printing line is thus completed.

In setting up a special character such as minus (—), a perforation is sensed in the X index position of a column by brushes RB. Magnet 168 is energized by the sensing of the X index point position to cause the upper end of zone arm 173 to be positioned opposite the X step of digit slide 167. From Fig. 13 it is seen that a hot zero impulse is supplied to print magnet 168 at 149° index timing to again energize this magnet. The digit slide 167 is released to engage the tooth designated 0 on rack 165. The digit slide then follows bail 188 in its movement until the slide encounters the zone arm 173. The set-up of the special character minus (—) at the printing line is thus completed.

The rack 165 (Figs. 1*a*, 1*b*) is provided with a row of teeth on the upper surface which are in mesh with a small gear 189 secured to a shaft 190. Also fastened to shaft 190 is a large gear 191 which is in mesh with the lower segment of a type wheel 192, rotatably mounted on a rod 197, to position the wheel so that an asterisk is at the printing line. The periphery of wheel 192 is formed with fifty gear teeth 194 (Fig. 8), the ends of which are flattened to provide a type element face. Wheel 192 has a type element 193 for each of the characters shown in the perforation code of Fig. 11, there being only three blank positions. As the wheel is moved clockwise, the type elements 193 pass the printing line in the order in which they are arranged in Fig. 11 reading from left to right. A type aligner bail arm 195 is pivotally mounted at 196 and carries a roller 198 which is maintained in constant engagement with aligner bail cam 123 under influence of a spring 199. The aligner bail 195*a* is brought into engagement with the teeth 194 of wheel 192 at 216° index timing (Fig. 12) by the aligner bail cam 123. This device is operable to bring the type wheel 192 into perfect alignment for the printing operation which follows.

*Print bail operating mechanism.*—With the type wheel thus positioned, the printing platen is actuated to take an impression therefrom. This platen is shown at 200 in Figs. 1*a* and 8 carrying a print pad 210 and is supported by a pair of toggle links 201 and 202. Link 201 is pivotally mounted at 203 in a slotted portion of a support bracket 205. The upper portion of link 201 has an extension which carries a cam follower 206. This follower is held in constant engagement with a print cam 268 through a coil spring 207. This cam is secured on the constantly rotating shaft 37 between frame plates 22 and 23. Link 202 is pivotally connected to the lower portion of link 201 and to a rod 208 extending from platen 200. A vertically movable arm 209 extends from rod 208 to a support bar 213 and acts as a guide for the platen 200 when it is actuated. A second guide arm 211 extends from pivot 203 to rod 208 and serves to maintain the links 201 and 202 in proper operating alignment.

Figure 8:
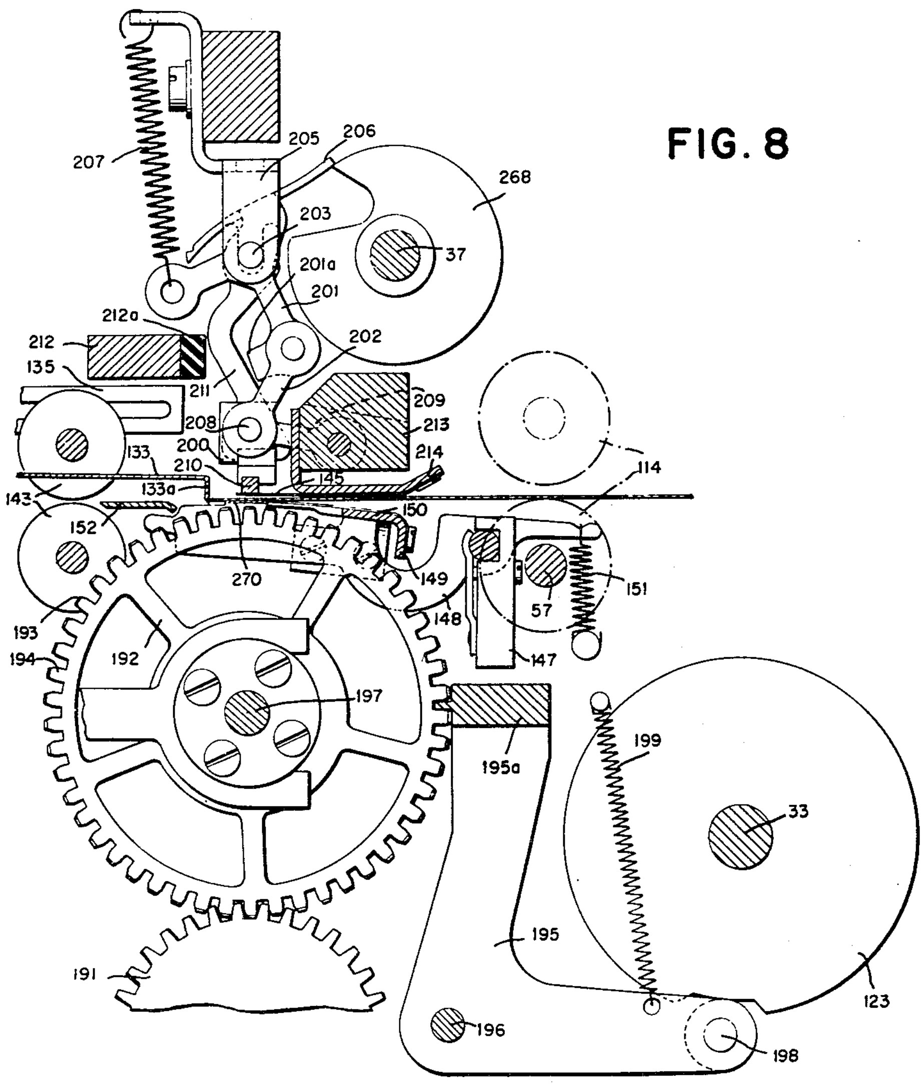
Fig. 8 is a detail view showing the card printing devices at the printing station.

At approximately 232° index timing (Fig. 12) cam follower 206 drops into the depression in print cam 268, and toggle links 201 and 202 straighten out under influence of spring 207 to move platen 200 downwardly. A stop member 212 having a rubber cushion 212*a* is positioned to the left of the toggle links, as shown in Fig. 8, and cooperates with a tail 201*a* on link 201 to limit the movement of the links during actuation. This movement drives print pad 210 against the card positioned between the type wheel 192 and the platen 200 to effect printing on the card of the character at the printing line at approximately 234°. At this time the platen 200 starts to restore and reaches a fully restored position at 252°.

An inking ribbon 270 is shown in Fig. 8 and extends across the type wheels 192 to permit an impression to be made on a card at the printing line. This ribbon 270 is fed by the usual ribbon feeding mechanism.

Mechanism is provided at the printing station (Fig. 8) to guide the cards therethough and properly support them during the printing operation. A guide plate 145 is secured to a bracket 214 which extends between frame plates 22 and 23. This guide prevents the leading edge of the cards from engaging the vertical rear wall of the print pad 210 and causing a card jam at the printing station. A rod 146 is supported between a pair of brackets 147, one bracket being fastened to each frame plate 22 and 23. A support arm 148 is pivotally mounted on rod 146 near each bracket 147. These arms 148 are connected by an L-shaped bar 149 which is fastened to each arm. A plate 150 is secured to bar 149 and functions as a support for the cards at the printing line. A coil spring 151 is provided for each arm 148 to urge the arms in a clockwise direction about rod 146, as viewed in Fig. 1*a*, until a plate 152 is encountered. This plate 152 defines the upper limit of rotation of the arms and maintains the support plate 150 in operating position.

*Repetitive printing mechanism*

The present invention is concerned with the mechanism by which information punched in master cards can be read and printed on the master cards and on the detail cards succeeding each master card under control of a perforation in a control index position of a selected column in each master card. The machine can be conditioned to print information in the same manner under control of a perforation in a selected column of each detail card.

Referring now to Fig. 2, a pair of clutch control magnets 73 are mounted on a bracket 281 secured to frame plate 21. These magnets have a common armature 282 pivotally mounted on bracket 281 at 283. A spring 284 normally biases the armature to the position of Fig. 2 where it is engaged by the high step 285*a* of a latch member 285. This latch is pivotally mounted on a stud 286 secured on bracket 281. An arm 287 is pivotally mounted on stud 286 and has a camming surface 287*a*. A spring 288 extends between the arm 287 and bracket 281 to bias latch 285 in a counterclockwise direction through a stud 287*b* carried by arm 287. A keeper 289 is also pivotally mounted on stud 286 and is biased clockwise against a stud 285*b* on latch 285 by a spring 290 extending between keeper 289 and latch 285. The gear 72 has a pawl 292 pivoted thereon at 293 and a spring 294 urges pawl 292 in a clockwise direction about pivot 293. Pawl 292 has a lug 292*a* which is engaged by the latch 285 to hold the pawl out of engagement with the tooth of the square tooth ratchet 295 against the pressure of spring 294. Ratchet 295 is continuously rotated with the constantly running gear 70. When the magnets 73 are energized, armature 282 is attracted against the pressure of spring 284 and withdrawn from the high step 285*a* of latch 285. The latch is then moved counterclockwise about pivot point 286 under pressure of spring 288 until a lower step 285*c* engages the armature. This action releases pawl 292 to engage the one tooth of ratchet 295, thus transmitting drive to shaft 71 and the auxiliary camshaft 83 which carries the digit slide cam 250. The gear 72 also carries a camming member 296 which engages the camming surface 287*a* later in the cycle to rock arm 287 in a clockwise direction about point 286 which causes latch 285 to follow under influence of a spring 291 extending between arm 287 and latch 285. Since the impulse is of short duration from the sensing pins 220 to energize magnets 73, the armature 282 is permitted to return to the initial position under step 285*a* by pressure of spring 284. The latch 285 is again positioned in the path of pawl lug 292*a* to cause the pawl 292 to be withdrawn from the tooth of ratchet 295 upon engagement with the latch and the driving connection to shaft 71 and camshaft 83 is broken. When pawl lug 292*a* engages the latch 285, keeper 289 falls behind the lug under pressure of spring 290 to hold the lug in position until it is again released by energization of magnets 73.

Referring again to Fig. 4, the active cam follower 242 is provided with a spring loaded latch 297 secured to a short shaft 314 which is rotatably mounted in this follower. During repetitive printing the latch is seated on a stop bar 298 extending from frame plate 21. A spring 315 urges the latch 297 counterclockwise as in Fig. 4. It is thus apparent that the active cam follower 242 is disengaged from the complementary cam follower 243 and no motion is imparted to shaft 161 by the rotation of cams 264 and 265 and the setup at the printing station remains unchanged.

When the machine is repetitive printing, the zone arm bail 175 is engaged by a slide 299 which prevents the zone mechanism from being restored as shown in Fig. 7. Slide 299 is yieldably connected to another slide 300 by a spring 301. Each slide is provided with a slot by which it is mounted on a pair of studs 302 and 304. The studs are carried by a bracket 305 fastened to frame plate 22. A spring 306 extends between slide 300 and the bracket 305 to urge the upper ends of the slide slots against stud 302 (Figs. 5 and 6). The lower portion of slide 300 has a camming surface 300*a* which is positioned for engagement by an extension 160*a* which projects outwardly from the type rack follower arm 160. In Fig. 7 the follower arm 160 has engaged the surface 300*a* to move slide 300 upwardly which in turn carries slide 299 into engagement with the zone bail 175, thus locking it in position. Since the shaft 161 is not rocked during repetitive printing, as explained above, the follower arm 160 holds slide 299 against bail 175 to prevent restoration of the zone mechanism.

A cam follower arm 307 (Fig. 4) is freely mounted on the shaft 259 outside frame plate 21 through a sleeve 308. The arm 307 carries a roller 309 which engages a cam 310 secured to shaft 71. A spring 311 extends between arm 307 and frame plate 21 to maintain roller 309 against cam 310. An actuating arm 312 is rigidly mounted on the sleeve 308 and is adapted to operate the spring loaded latch 297. When the ratchet clutch is engaged to drive shaft 71 as previously described, the cam 310 is rotated to effect a new set up at the printing station. This cam is timed so that the roller 309 leaves the high point on cam 310 at the beginning of the cam rotation. This occurs at 110° as seen in Fig. 12. The actuating arm 312 is at this time in engagement with an arm 313 secured to the latch shaft 314 on the inside of cam follower 242. As the roller 309 moves to the low dwell of cam 310, the arm 312 is moved counterclockwise, as viewed in Fig. 4, under pressure of spring 311. The latch 297 being spring loaded returns with the arm 312 and is unseated from stop bar 298 to engage a notch 243*a* in the cam follower 243, thereby latching together the cam followers 242 and 243. At 210° of the cycle the type rack follower arm 160 and crosshead 162 move downwardly under the influence of the complementary cams 264 and 265 on the now latched cam followers 242 and 243 to restore the rack 165 and condition the machine for a new rack setting on the following cycle. As the downward motion of the follower arm 160 begins, the pressure of extension 160*a* on slide 300 is removed and the zone arm bail 175 is released by the locking slide 299 by the action of spring 306. The zoning mechanism is then permitted to restore to condition the machine for the new setting. At 186° of the next cycle the roller 309 moves on the high point of cam 310 to again move arm 307 in a clockwise direction to allow arm 312 to engage latch arm 313 and return the latch 297 to its seat on stop bar 298. This action is repeated each time a perforation is sensed by the pins 220 in an X index position.

*The circuit diagram*

The circuit diagram (Figs. 14*a* and 14*b*) electrically coordinates the various mechanisms described hereinabove, and the manner in which the machine functions to cause printing from perforations on a card will now be explained in connection with the circuit diagram. There are several cam controlled contacts prefixed C, the timing of which is given in the chart (Fig. 13) to which reference may be made when tracing circuit paths. A number of relays are shown on the diagram, and in each case they are identified by the letter R. The contacts controlled by the relays are given the same reference character as the relays, followed by a lower case letter.

A number of wires in the circuit diagram terminate in plug sockets indicated by small circles between which connections are made in accordance with the particular requirements of the information to be printed by the machine. In the actual machine the plug sockets are extended to the rear of a plug-board (not shown) on which they are grouped and identified.

Referring to Fig. 14*a*, closure of the main starting switch S will condition the circuit for a start motor M for subsequent completion upon the energization of a relay R14 as later described. A suitable D. C. source provides 40 v. across lines 318 and 319. Closure of start key contacts 324 will establish a circuit from line 318 through the pick-up coil of a relay R10, start key contacts 324, normally closed "*b*" contacts of a check stop relay R12 to line 319. Energization of the start relay R10 closes its "*a*" contacts to complete a circuit through the hold coil of relay R10 as follows: From line 318, through the hold coil of relay R10, "*a*" contacts of relay R10, stop key contacts 325 (normally closed), normally closed "*b*" contacts of check stop relay R12 to line 319. The "*b*" contacts of relay R10 are also closed by the energization of relay R10 to complete a circuit through motor control relay R14 as follows: From line 318, through relay R14, "*b*" contacts of relay R10 to line 319. The relay R14 closes its "*a*" contacts to supply current to the driving motor M through the A. C. circuit as indicated. In addition the closure of the "*b*" contacts of the start relay R10 causes the magnet 106 to be energized through the following circuit: From line 318, through magnet 106, relay contacts R10*b* to line 319. This magnet 106 controls the card feeding mechanism as explained in the mechanical description.

When the machine is thus placed in proper operation, the cards are fed from the magazine 107 to the reading station. As the leading edge of the first card engages card lever 131, the contacts CL1 are closed to permit subsequent completion of circuits controlled from the sensing of perforations as the index point positions of the record card traverse the analyzing brushes RB. In setting up the machine for operation, a plug connection 326 is made from the plug socket 327 of a brush RB to the plug socket 328 of a selected column where printing is desired. For purposes of this description only four columns are shown in Fig. 14*a*, but it should be understood that there are eighty columns on each record card from which to read the perforated data and sixty possible printing positions. A print magnet 168 is associated with each printing position so that the plug sockets 327 can be connected to those particular plug sockets 328 in the printing positions desired.

For example, when a perforation is sensed by a brush RB in column 1, a circuit is completed to energize magnet 168 through cam contacts C1 and C2 which, from Fig. 13 it will be seen, are closed during the time that each perforation is analyzed by the brushes RB. Cam contacts C2 lag the cam contacts C1 in closing by 1° index timing. These contacts are closed by dentated cams which are driven by shaft 37 (Fig. 2) so as to rotate once for each machine cycle of operation. This circuit is traceable as follows: From line 318, through print magnet 168, plug socket 328, plug wire 326, plug socket 327, brush RB, common contact roller 129, card lever contacts CL1, cam contacts C1 and C2 to line 319.

Referring again to Fig. 13, a hot zero impulse is supplied to the print magnets 168 at hot zero time, which is one cycle point after the 9 index point time or 148° for cam contacts C1 and 149° for cam contacts C2. At the hot zero time the card has already passed the brushes RB, and the following card has not yet moved under the brushes. Therefore, the brushes RB are in contact with roller 129 to complete a circuit through the magnet 168 in each column similar to the one traced hereinbefore for a perforation sensed in column 1. This impulse permits a special character represented by a perforation in the R, X, or 0 index position alone to be printed. These characters are zero (0), minus (—), and ampersand (&). This impulse allows the digit slide 167 to engage the 0 tooth of its associated rack 165 and stop the rack in its travel. After the digit slide encounters the zone arm 173, the type wheel 192 is in position to print the special character. Without this impulse the type wheel 192 is moved to a blank position.

Referring now to Fig. 13, it is seen that cam contacts C6 are opened at 24° index timing to break the circuit through solenoid 141. This permits the card stop 133 (Fig. 1*a*) to drop into the path of an advancing record card at the printing station to position the card for the printing operation. At 240° index timing the contacts C6 are closed to again complete a circuit through solenoid 141 as follows: From line 318 through solenoid 141, cam contacts C6 to line 281. The energization of solenoid 141 at this time causes the stop 133 to be pulled upwardly and out of the path of the record card which has just received printed characters.

*Repetitive printing circuits.*—Repetitive printing from a master card is accomplished in this machine by setting on the type wheels 192 (Fig. 1*a*) information derived from perforations in the master card and maintaining the rack restoring cams 269 and 265 (Fig. 4) ineffective by holding follower arm 243 out of latching engagement with follower arm 242. The setting on the type wheels 192 is thus maintained throughout subsequent successive printing cycles, until a perforation is sensed in the X index position of a selected column of a following master card.

Referring now to Fig. 14*b*, when the master card contains a control perforation, for example, in the X position of column 80, the machine is set for repetitive printing by moving the repetitive printing switch 330 to the "on" position and by setting the switch 331 at the "X master" position. A plug socket 333 is electrically wired to the segment 320 for the pin 220 at the presensing station related to column 80. A plug connection 332 is made from the plug socket 333 to the plug socket 334 which is the X control hub. For purposes of this description only three control read X sockets 333 are shown in Fig. 14*b*, but it is understood that there are twenty such hubs on the plug-board of the machine which can be wired to the segments 320 for any selected group of the pins 220, so that each of the eighty pins 220 is wired into one of the twenty hubs. When a perforation is sensed by the pin 220 in column 80 which is associated with socket 333, a circuit is established to pick up relay R16 through cam contacts C3 which, from Fig. 13, it will be seen, are closed during the time that the X perforation is sensed by the pins 220. This circuit is traceable as follows: From line 319 through cam contacts C3 (now closed), wire 323, a segment 320, pin 321, common plate 232, pin 220, a conductive segment 320, wire 322, socket 333, plug connection 332, socket 334, pick-up coil of relay R16 to line 318. Energization of relay R16 closes its "*a*" contacts to complete a circuit through cam contacts C5 and the hold coil of relay R16 as follows: From line 319, cam contacts C5 (now closed), "*a*" contacts of relay R16, hold coil of relay R16 to line 318. The "*b*" contacts of relay R16 are also transferred by the energization of relay R16 to complete a circuit through the clutch control magnets 73 as follows: From line 319 through cam contacts C4 (now closed), switch 331, "*b*" contacts of relay R16 (transferred), magnets 73 to line 318. The cam contacts C5 hold relay R16 energized until after the impulse from C4 has passed through the transferred relay contacts R16*b*. The energization of magnets 73 causes actuation of the repetitive printing clutch and restoration of the racks 165 as explained in connection with the mechanical description. When the switch 331 is in the "off" position, the "*b*" contacts of relay R16 are shunted and the magnets 73 are energized on each cycle to cause restoration of the racks 165. After the card has been sensed by pins 220, a brush RB at the reading station will sense the control perforation in the X position of column 80. Since no plug connection to a printing magnet 168 has been made in this column, the special character minus (—) is not set on the related type wheel 192 in response to the hot zero impulse.

The machine can also be conditioned to perform the same function when the control perforation is punched in the detail cards rather than in the master cards. The repetitive printing switch 330 remains in the "on" position and the switch 331 is moved to the "X detail" position. With the same plug connections in column 80 as above, the sensing of a perforation in each detail card causes a transfer of the relay contacts R16*b* to open the circuit to clutch magnets 73, thereby preventing energization of these magnets when cam contacts C4 are closed. When a control perforation is not sensed by pins 220 in the master card, the relay R16 is not picked up and the relay contacts R16*b* are not transferred. The closure of cam contacts C4 at 204° of the cycle causes energization of magnets 73 through a circuit as follows: From line 319 through cam contacts C4, switch 331, contacts R16*b* (normal), magnets 73 to line 318. The repetitive printing clutch is actuated by magnets 73 as before.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a cyclically operable machine for printing data represented by perforations in record cards, means for advancing two classes of record cards successively along a path, one of said classes including cards having a control perforation therein, a printing means having a setting thereon, a first means for sensing said control perforation in a card, early in the cycle, means to restore the setting of said printing means to a blank condition, means responsive to the sensing of said perforation by the first sensing means to control said restoring means so that said setting is restored to a blank condition, a second means for sensing perforations representing data on the card having the control perforation to cause a new setting on said printing means later in the same cycle, whereby said new setting is retained and printing is effected from said new setting on each succeeding card until a control perforation is again sensed by said first sensing means to restore the new setting to a blank condition.

2. In an interpreter, a first sensing station comprising record sensing means, a printing station comprising record printing means, means to feed interspersed master and detail records through said stations in sequence, means for causing a setting on said printing means in response to the sensing of coded indicia on a master record by said first sensing means, a second sensing station comprising means for sensing control indicia on a master record before it reaches said first sensing means and said printing means, means to restore the setting on said printing means to a blank condition, and means responsive to the sensing of control indicia on one class of said records by said sensing means at the second station to control said restoring means, so that said setting is restored to a blank condition before a new setting is effected in response to the sensing of indicia on said master record by said first sensing means and said setting is retained in the intervals between master records.

3. In an interpreter for printing on master and detail control records, information stored by coded designations on the master records, a first means for sensing the designations on the master records, printing means for printing on the records, means for feeding interspersed master and detail records through said sensing means and said printing means in sequence, a print selector mechanism for controlling said printing means, means under control of said first sensing means for causing said mechanism to set said printing means to represent information read from said master records, a second sensing means for sensing a control designation on a master record before it reaches said first sensing means and said printing means, means to restore the setting on said printing means to a blank condition, and means responsive to the sensing of said control designation by said second sensing means to control said restoring means, so that said setting is restored to a blank condition before a new setting is effected by said selector mechanism in response to the sensing of coded designations on the master card by said first sensing means and said setting is retained in the intervals between master records.

4. In a cyclically operable machine for printing on master and detail control records, information stored by coded sensible indicia on the master records, sensing means for sensing the coded indicia on the master records, printing means for printing on the records, means to feed a series of master and detail records past said sensing means and said printing means in sequence, with each master card followed by one or more detail records, means for causing a setting on said printing means in response to the sensing of coded indicia on a master record by said first sensing means, pre-sensing means for sensing control indicia on a record early in a record reading cycle and before it reaches said sensing means and said printing means, means to restore the setting on said printing means to a blank condition, means responsive to the sensing of control indicia on one class of said records by said pre-sensing means to control said restoring means, so that said setting is restored to a blank condition before a setting is effected in response to the sensing of indicia from each new master record and retains its settings in the intervals between master records, and means for operating said printing means on each machine cycle to effect printing on a record presented thereto from the setting on the printing means.

References Cited in the file of this patent

UNITED STATES PATENTS

| | | |
|---|---|---|
| 1,506,382 | Pierce | Aug. 26, 1924 |
| 1,750,191 | Pierce | Mar. 11, 1930 |
| 1,946,915 | Pierce | Feb. 13, 1934 |
| 1,954,041 | Daly | Apr. 10, 1934 |
| 2,036,024 | Daly | Mar. 31, 1936 |
| 2,139,919 | Mills | Oct. 4, 1938 |
| 2,157,980 | Daubmeyer | May 9, 1939 |